(12) United States Patent
Kanzaki

(10) Patent No.: US 11,647,298 B2
(45) Date of Patent: May 9, 2023

(54) IMAGE PROCESSING APPARATUS, IMAGE CAPTURING APPARATUS, IMAGE PROCESSING METHOD, AND STORAGE MEDIUM

(71) Applicant: CANON KABUSHIKI KAISHA, Tokyo (JP)

(72) Inventor: Akane Kanzaki, Kanagawa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 243 days.

(21) Appl. No.: 17/099,612

(22) Filed: Nov. 16, 2020

(65) Prior Publication Data
US 2021/0152727 A1    May 20, 2021

(30) Foreign Application Priority Data
Nov. 20, 2019    (JP) .............................. JP2019-209824

(51) Int. Cl.
*G06T 5/00*    (2006.01)
*H04N 5/235*   (2006.01)
*G06T 5/50*    (2006.01)

(52) U.S. Cl.
CPC ........... *H04N 5/2355* (2013.01); *G06T 5/009* (2013.01); *G06T 5/50* (2013.01); *H04N 5/2351* (2013.01);
(Continued)

(58) Field of Classification Search
CPC .... H04N 5/2355; H04N 5/2351; H04N 9/646; H04N 9/78; H04N 9/04557; H04N 9/77; G06T 5/009; G06T 5/50; G06T 2207/10024; G06T 2207/20024; G06T 5/10; G06T 2207/20064; G06T 5/20; G06T 5/003; G06T 5/002; G06T 5/007;
(Continued)

(56) References Cited

U.S. PATENT DOCUMENTS 11,438,523 B2 * 9/2022 Nashizawa .......... H04N 5/2355
2010/0225821 A1 * 9/2010 Park ...................... H04N 9/646
348/665
(Continued)

FOREIGN PATENT DOCUMENTS

CN      108646999 A  * 10/2018  .......... G06F 1/3265
JP        4016072 B2    12/2007
(Continued)

*Primary Examiner* — Jose L Couso
(74) *Attorney, Agent, or Firm* — Canon U.S.A., Inc. IP Division

(57) ABSTRACT

An image processing apparatus includes a first filter unit and a first composition unit. The first filter unit generates a plurality of results of filter processing for brightness by individually applying each of a plurality of filters for brightness with different frequency bands to a first brightness component image indicating a distribution of brightness components in a first image. The plurality of filters for brightness are spatial filters based on a visual characteristic of a human related to contrast detection. The first composition unit generates brightness contrast influence information indicating a distribution of degrees of influence of brightness contrast in the first image by compositing together the plurality of results of filter processing for brightness.

25 Claims, 15 Drawing Sheets

(52) U.S. Cl.
CPC ........... *G06T 2207/10024* (2013.01); *G06T 2207/20024* (2013.01)

(58) Field of Classification Search
CPC . G06T 2207/20056; G06T 2207/20032; G06T 2207/20016; G06T 2207/20182; G06K 9/00; G06V 10/00
See application file for complete search history.

(56) References Cited

U.S. PATENT DOCUMENTS

| | | | |
|---|---|---|---|
| 2010/0238356 A1* | 9/2010 | Kida .................... | G09G 5/10 348/618 |
| 2011/0134292 A1* | 6/2011 | Hirai .................... | H04N 9/646 348/E9.005 |
| 2011/0157482 A1* | 6/2011 | Adachi .................. | G06T 5/009 348/739 |
| 2012/0020556 A1* | 1/2012 | Manabe ............... | H04N 5/2355 382/167 |

FOREIGN PATENT DOCUMENTS

| | | |
|---|---|---|
| JP | 2019-071568 A | 5/2019 |
| WO | 2006/132014 A1 | 12/2006 |

* cited by examiner

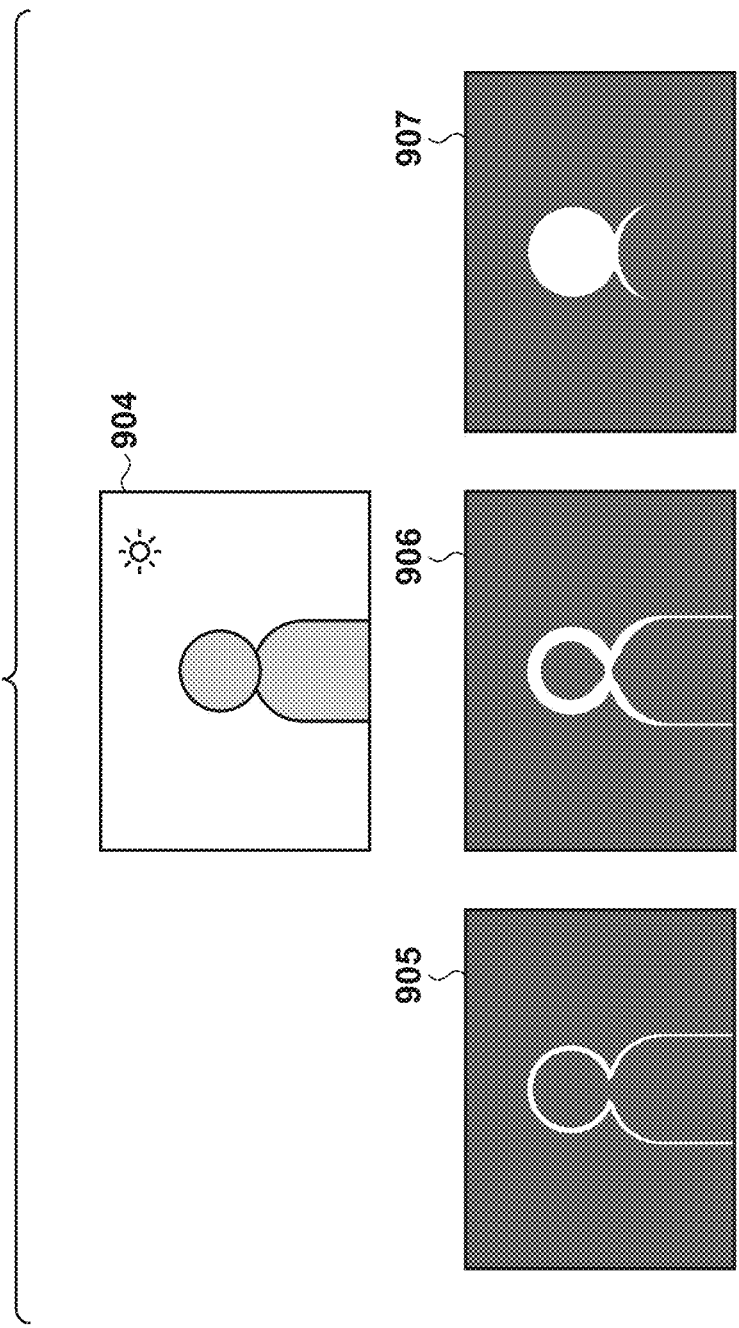

IMAGE PROCESSING APPARATUS, IMAGE CAPTURING APPARATUS, IMAGE PROCESSING METHOD, AND STORAGE MEDIUM

BACKGROUND

Technical Field

One disclosed aspect of the embodiments relates to an image processing apparatus for brightness processing, an image capturing apparatus, an image processing method, and a storage medium.

Description of the Related Art

In recent years, High Dynamic Range (HDR)-compatible display devices with an enlarged dynamic range are becoming widespread. HDR images enable representation of videos that are bright compared to conventional ones, thereby showing the contrast effects more prominently than conventional Standard Dynamic Range (SDR) images. The contrast effects mentioned in the present specification refer to the phenomenon in which the appearance of the brightness and saturation of a foreground changes with a change in the brightness and saturation of a background. For example, if the brightness or saturation of the background increases, the foreground appears dark, faded in color, or high in contrast.

Due to the contrast effects, the appearance of the brightness and saturation of a main subject in an HDR image differs from that in a conventional SDR image; this has become a problem in some scenes. For example, in a portrait scene for an HDR image, when a background is bright due to contre-jour and the like, the difference in brightness/darkness between the background and a person in a foreground is emphasized by the contrast effects, and the face of the person appears dark.

Furthermore, while there is a technique to convert an HDR image into an SDR image in order to view the HDR image also on an SDR monitor, the HDR image and the SDR image appear different from each other in contrast due to the contrast effects when viewed in comparison with each other; this has become a problem in some scenes. For example, in a night-view scene for an HDR image, the vicinity of a light source of illumination appears high in contrast and sparkly due to the contrast effects. However, the impression thereof when viewed in the HDR image changes in a converted SDR image, in which the contrast effects are reduced and the contrast is lowered.

Japanese Patent No. 4016072 discloses a technique to generate an image that takes a plurality of frequencies into consideration by performing processing for converting luminance values of respective pixels into values representing numerical values that are conveniently allocated to adjectives (from very dark to very bright) indicating human perceptions of brightness that are commonly used in the field of designing of a light environment, and by performing wavelet composition, with respect to each of luminance images obtained through wavelet decomposition. Meanwhile, Japanese Patent Laid-Open No. 2019-071568 discloses a technique to perform tone conversion by making an adjustment to a tone conversion curve corresponding to a dynamic range of an input image so that changes in luminance are visually the same in a bright portion and a dark portion.

However, the technique disclosed in Japanese Patent No. 4016072 causes the occurrence of an artifact attributed to the wavelet transform in an image, and is thus inappropriate in direct image correction. On the other hand, with the technique disclosed in Japanese Patent Laid-Open No. 2019-071568, as the adjustment is made using the tone conversion curve, the distribution of degrees of influence of contrast in a space direction is not taken into consideration, and correction is performed uniformly throughout a screen.

SUMMARY

The disclosure has been made in view of the aforementioned situation, and provides a technique to generate information indicating the distribution of degrees of influence of contrast in an image. Note that the "image" mentioned here is not limited to an HDR image because an image in which the contrast effects can occur is not limited to the HDR image.

According to a first aspect of the embodiments, an image processing apparatus includes a first filter unit and a first composition unit. The first filter unit is configured to generate a plurality of results of filter processing for brightness by individually applying each of a plurality of filters for brightness with different frequency bands to a first brightness component image indicating a distribution of brightness components in a first image. The plurality of filters for brightness are spatial filters based on a visual characteristic of a human related to contrast detection. The first composition unit is configured to generate brightness contrast influence information indicating a distribution of degrees of influence of brightness contrast in the first image by compositing together the plurality of results of filter processing for brightness.

According to a second aspect of the embodiments, an image capturing apparatus includes the image processing apparatus according to the first aspect and an image capturing unit configured to generate the first image.

According to a third aspect of the embodiments, an image processing apparatus includes a filter unit and a composition unit. The filter unit is configured to generate a plurality of results of filter processing for color by individually applying each of a plurality of filters for color with different frequency bands to a color component image indicating a distribution of color components in an image. The plurality of filters for color are spatial filters based on a visual characteristic of a human related to contrast detection. The composition unit is configured to generate color contrast influence information indicating a distribution of degrees of influence of color contrast in the image by compositing together the plurality of results of filter processing for color.

According to a fourth aspect of the embodiments, an image processing apparatus includes a filter unit and a composition unit. The filter unit is configured to generate results of a plurality of filter processing for saturation by individually applying each of a plurality of filters for saturation with different frequency bands to a saturation component image indicating a distribution of saturation components in an image. The plurality of filters for saturation are spatial filters based on a visual characteristic of a human related to contrast detection. The composition unit is configured to generate saturation contrast influence information indicating a distribution of degrees of influence of saturation contrast in the image by compositing together the plurality of results of filter processing for saturation.

According to a fifth aspect of the embodiments, an image processing method executed by an image processing apparatus, includes generating a plurality of results of filter processing for brightness and generating brightness contrast influence information. The generating of a plurality of results of filter is performed by individually applying each of a plurality of filters for brightness with different frequency bands to a first brightness component image indicating a distribution of brightness components in a first image. The plurality of filters for brightness are spatial filters based on a visual characteristic of a human related to contrast detection. The generating of brightness contrast influence information, indicating a distribution of degrees of influence of brightness contrast in the first image, is performed by compositing together the plurality of results of filter processing for brightness.

According to a sixth aspect of the embodiments, an image processing method executed by an image processing apparatus includes generating a plurality of results of filter processing for color and generating color contrast influence information. The generating of a plurality of results of filter processing for color is performed by individually applying each of a plurality of filters for color with different frequency bands to a color component image indicating a distribution of color components in an image. The plurality of filters for color are spatial filters based on a visual characteristic of a human related to contrast detection. The generating of color contrast influence information, indicating a distribution of degrees of influence of color contrast in the image, is performed by compositing together the plurality of results of filter processing for color.

According to a seventh aspect of the embodiments, an image processing method executed by an image processing apparatus, includes generating results of a plurality of filter processing for saturation and generating saturation contrast influence information. The generating of results of a plurality of filter processing for saturation is performed by individually applying each of a plurality of filters for saturation with different frequency bands to a saturation component image indicating a distribution of saturation components in an image. The plurality of filters for saturation are spatial filters based on a visual characteristic of a human related to contrast detection. The generating of saturation contrast influence information, indicating a distribution of degrees of influence of saturation contrast in the image, is performed by compositing together the plurality of results of filter processing for saturation.

According to an eighth aspect of the embodiments, a non-transitory computer-readable storage medium stores a program for causing a computer to execute an image processing method including generating a plurality of results of filter processing for brightness and generating brightness contrast influence information. The generating of a plurality of results of filter processing for brightness is performed by individually applying each of a plurality of filters for brightness with different frequency bands to a first brightness component image indicating a distribution of brightness components in a first image. The plurality of filters for brightness are spatial filters based on a visual characteristic of a human related to contrast detection. The generating of brightness contrast influence information, indicating a distribution of degrees of influence of brightness contrast in the first image, is performed by compositing together the plurality of results of filter processing for brightness.

According to a ninth aspect of the embodiments, a non-transitory computer-readable storage medium stores a program for causing a computer to execute an image processing method including generating a plurality of results of filter processing for color and generating color contrast influence information. The generating of a plurality of results of filter processing for color is performed by individually applying each of a plurality of filters for color with different frequency bands to a color component image indicating a distribution of color components in an image. The plurality of filters for color are spatial filters based on a visual characteristic of a human related to contrast detection. The generating of color contrast influence information, indicating a distribution of degrees of influence of color contrast in the image, is performed by compositing together the plurality of results of filter processing for color.

According to a tenth aspect of the embodiments, a non-transitory computer-readable storage medium stores a program for causing a computer to execute an image processing method including generating results of a plurality of filter processing for saturation and generating saturation contrast influence information. The generating of results of a plurality of filter processing for saturation is performed by individually applying each of a plurality of filters for saturation with different frequency bands to a saturation component image indicating a distribution of saturation components in an image. The plurality of filters for saturation are spatial filters based on a visual characteristic of a human related to contrast detection. The generating of saturation contrast influence information, indicating a distribution of degrees of influence of saturation contrast in the image, is performed by compositing together the plurality of results of filter processing for saturation.

Further features of the disclosure will become apparent from the following description of exemplary embodiments with reference to the attached drawings.

BRIEF DESCRIPTION OF THE DRAWINGS

FIG. 9C is a diagram illustrating the results of filter processing.

DESCRIPTION OF THE EMBODIMENTS

Figure 1:
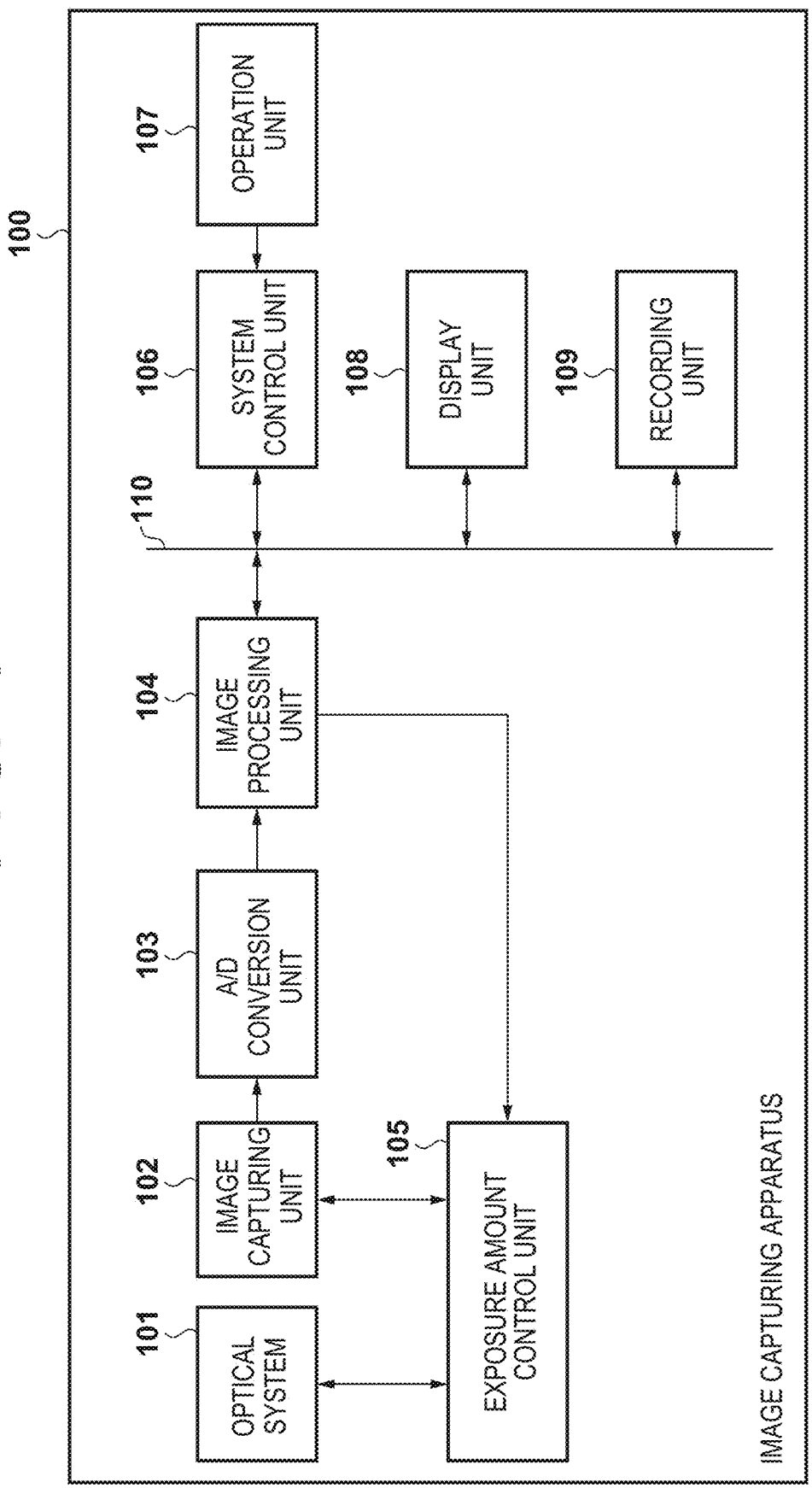
FIG. 1 is a block diagram showing a configuration of an image capturing apparatus 100 that includes an image processing apparatus.

Hereinafter, embodiments will be described in detail with reference to the attached drawings. Note, the following embodiments are not intended to limit the scope of the disclosure. Multiple features are described in the embodiments, but limitation is not made an embodiment that requires all such features, and multiple such features may be combined as appropriate. Furthermore, in the attached drawings, the same reference numerals are given to the same or similar configurations, and redundant description thereof is omitted.

First Embodiment

FIG. 1 is a block diagram showing a configuration of an image capturing apparatus 100 (e.g., a digital camera) that includes an image processing apparatus. In FIG. 1, an optical system 101 includes a lens assembly composed of a zoom lens and a focus lens, a diaphragm adjustment apparatus, and a shutter apparatus. The optical system 101 adjusts the magnification, the focus position, the light amount, and the like of a subject image that reaches an image capturing unit 102.

The image capturing unit 102 is a photoelectric conversion element, such as a Charge-Coupled Device (CCD) or Complementary Metal Oxide Semiconductor (CMOS) sensor, that converts light beams of a subject that have passed through the optical system 101 into electrical signals through photoelectric conversion. An analog-to-digital (A/D) conversion unit 103 converts input video signals into a digital image.

An image processing unit 104 performs exposure amount calculation processing and subject detection processing, such as facial detection, in addition to normal signal processing. In addition, the image processing unit 104 performs processing for generating evaluation values related to the influence of contrast (contrast influence information), and processing for correcting an image using the evaluation values. The image processing unit 104 can perform similar image processing not only with respect to an image output from the A/D conversion unit 103, but also with respect to an image that has been read out from a recording unit 109. The detailed configuration and operations of the image processing unit 104 will be described later.

In order to realize the exposure amount calculated by the image processing unit 104, an exposure amount control unit 105 controls a diaphragm, a shutter speed, and an analog gain of a sensor by controlling the optical system 101 and the image capturing unit 102.

A system control unit 106 is a control function unit that performs integrated control on the operations of the entirety of the image capturing apparatus 100. The system control unit 106 also controls driving of the optical system 101 and the image capturing unit 102 based on luminance values obtained from an image processed by the image processing unit 104 and on an instruction transmitted from an operation unit 107.

A display unit 108 is composed of a liquid crystal display or an organic Electro Luminescence (EL) display, and displays images generated by the image processing unit 104 and images that have been read out from the recording unit 109. The recording unit 109 has a function of recording images. The recording unit 109 may include, for example, an information recording medium that uses a memory card provided with a semiconductor memory, a package storing a rotatable recording member, such as a magneto-optical disc, and the like, and this information recording medium may be attachable and detachable.

A bus 110 is used to exchange images among the image processing unit 104, system control unit 106, display unit 108, and recording unit 109.

The following describes processing for generating pieces of contrast influence information indicating the degrees of influence of contrast at respective positions in an HDR image (the distribution of degrees of influence of contrast in the HDR image) and correcting the HDR image using the generated pieces of contrast influence information (contrast correction processing). Among the pieces of contrast influence information, contrast influence information related to brightness is referred to as brightness contrast influence information, and contrast influence information related to colors is referred to as color contrast influence information. While examples of color contrast include saturation contrast and hue contrast, the present embodiment will be described using saturation contrast as an example, and contrast influence information related to saturation is referred to as saturation contrast influence information. Note that in the present embodiment, an image that is to undergo contrast correction processing is not limited to an HDR image; for example, an SDR image may be used as an image that is to undergo the contrast correction processing.

Figure 2:
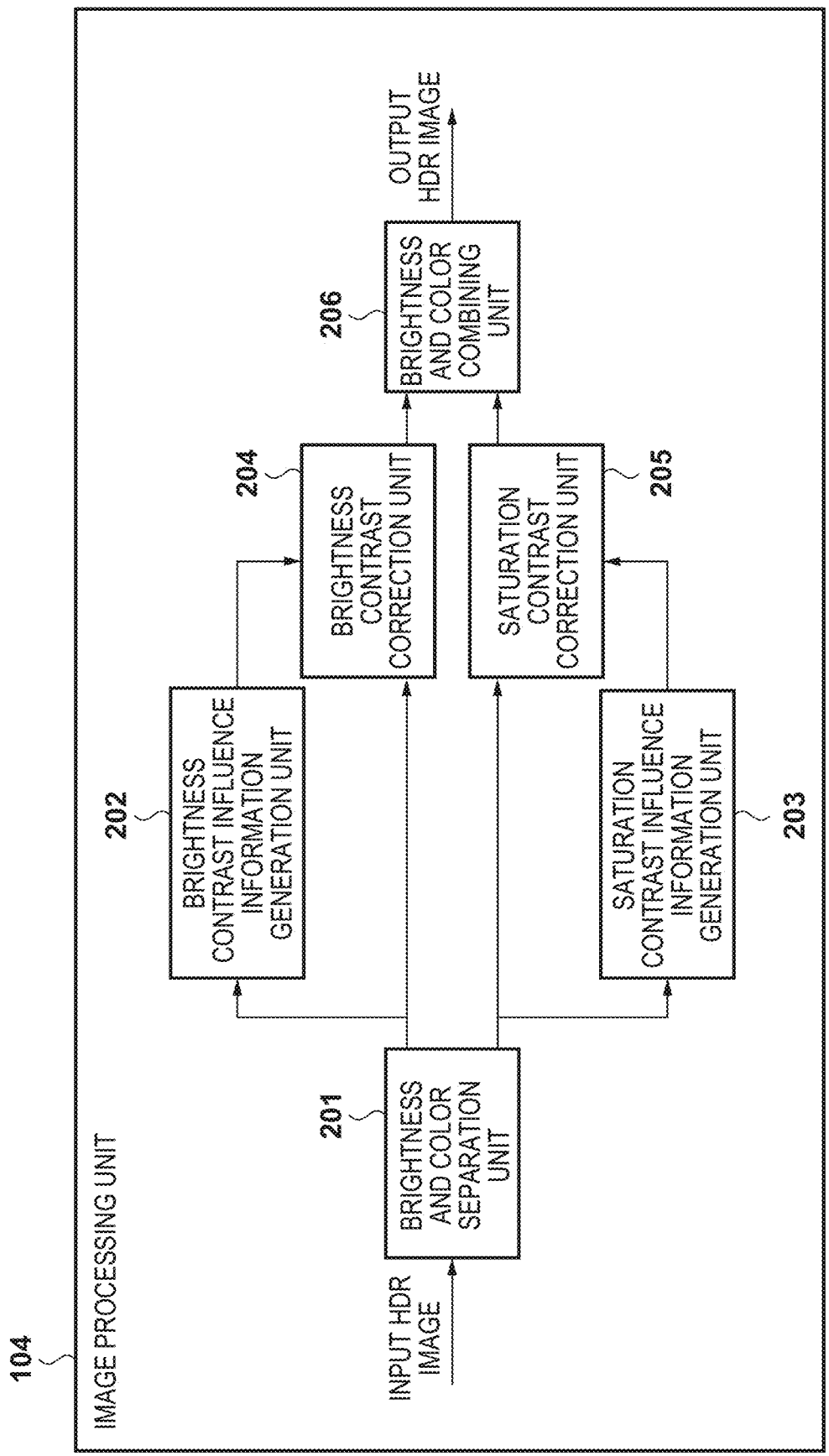
FIG. 2 is a block diagram showing a detailed configuration of a portion that is involved in contrast correction processing in an image processing unit 104 according to a first embodiment.

FIG. 2 is a block diagram showing a detailed configuration of a portion that is involved in the contrast correction processing in the image processing unit 104. The image processing unit 104 includes a brightness and color separation unit 201, a brightness contrast influence information generation unit 202, a saturation contrast influence information generation unit 203, a brightness contrast correction unit 204, a saturation contrast correction unit 205, and a brightness and color combining unit 206.

An HDR image that has been developed through normal signal processing of the image processing unit 104 is input to the brightness and color separation unit 201, and the HDR image that has undergone the contrast correction processing is output from the brightness and color combining unit 206. The input HDR image is, for example, an HDR image that has been generated by the image processing unit 104 developing a RAW image captured by the image capturing unit 102. The development is performed using, for example, the gamma of ST 2084 (PQ gamma) and the color space of Rec. 2020. The output HDR image is also an image corresponding to the gamma characteristics and the color space similar to those of the input HDR image. Furthermore, the input image and the output image are composed of RGB or YUV.

Figure 5:
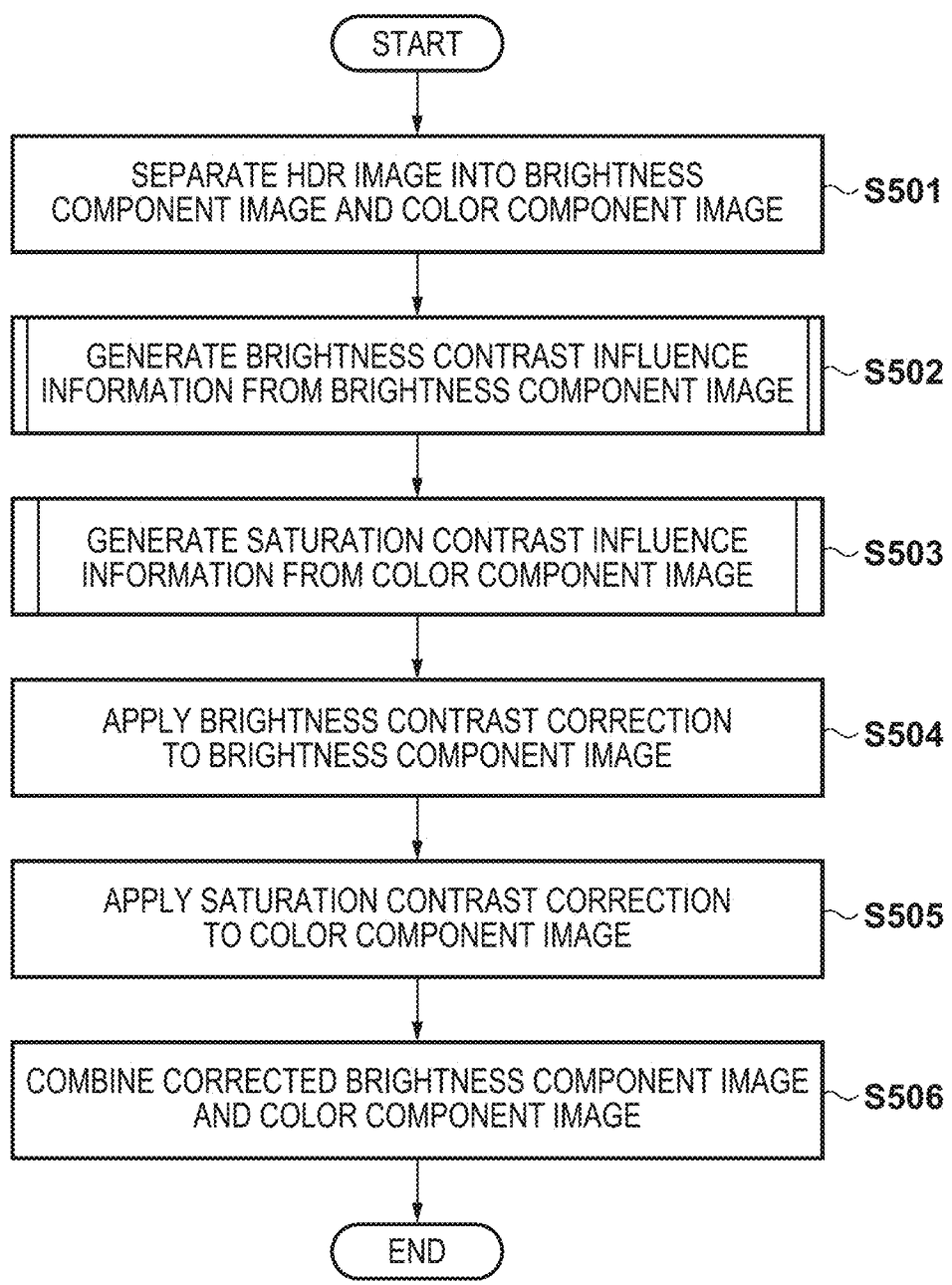
FIG. 5 is a flowchart of the contrast correction processing executed by the image processing unit 104 according to the first embodiment.

FIG. 5 is a flowchart of the contrast correction processing executed by the image processing unit 104. The processing of the present flowchart is started when an HDR image to be processed is input to the brightness and color separation unit 201. Note that the system control unit or circuit 106 controls the contrast correction processing by controlling respective components of the image capturing apparatus 100, including respective components of the image processing unit 104, in accordance with a control program stored in a Random Access Memory (RAM), Read Only Memory (ROM), or a flash memory (not shown) as necessary, unless specifically stated otherwise. Typically, the system control unit or circuit 106 includes a programmable device, processor, or a central processing unit (CPU) that executes a set of instructions or program stored in a memory device, such as a RAM, ROM or a flash memory device, to perform operations, which may correspond to the functional units described in the following.

In step S501, the brightness and color separation unit 201 separates the input HDR image into a brightness component image and a color component image. Specifically, the brightness and color separation unit 201 converts the HDR image into the ICtCp color space that takes the visual characteristic of a human into consideration, and separates the same into the brightness component image and the color component image. I represents the brightness component image, and Ct, Cp represent the color component image. Although the description is given using the ICtCp color space here, the separation into (the obtainment of) the brightness component image and the color component image may be performed based on a perceptually uniform color space of Lab (an Lab color space). Furthermore, reduction processing may be performed with respect to the separated brightness component image or color component image.

In step S502, based on the brightness component image separated in step S501, the brightness contrast influence information generation unit 202 generates brightness contrast influence information indicating the distribution of degrees of influence of brightness contrast in the HDR image. The brightness contrast influence information is in the form of, for example, a map that indicates the degrees of influence of brightness contrast on a per-position basis. In the following description, this map will be referred to as a brightness contrast influence map.

Figure 8A:
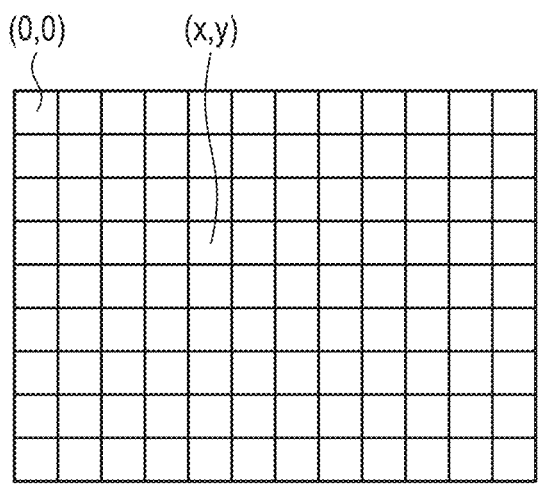
FIGS. 8A to 8C are diagrams illustrating a structure of a brightness contrast influence map.
Figure 8B:
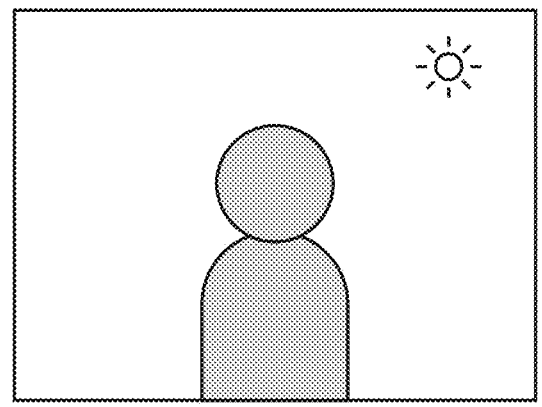
Figure 8C:
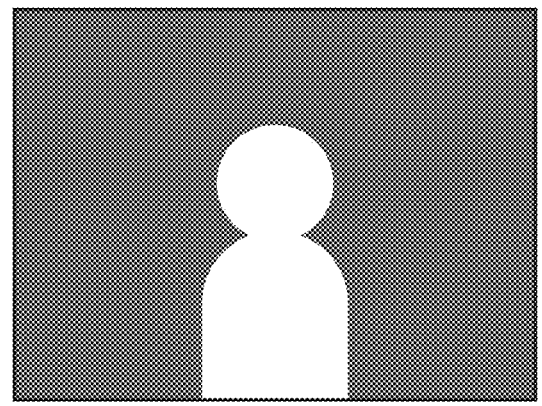

A description is now given of a structure of the brightness contrast influence map with reference to FIGS. 8A to 8C. As shown in FIG. 8A, the brightness contrast influence map stores signal values that indicate the degrees of influence of brightness contrast for respective sets of coordinates (x, y), with the upper-left coordinates being (0,0). For example, with regard to a portrait scene under contre-j our shown in FIG. 8B, the map indicating the degrees of influence of brightness contrast is as shown in FIG. 8C, in which a portion that appears darker due to the influence of brightness contrast (a higher degree of influence) is shown whiter.

In the present embodiment, the brightness contrast influence map has signal values that increase as the influence increases, with a portion that is not influenced by brightness contrast having 0. For example, when the brightness contrast influence map is represented using 8 bits, its signal values approach 255 from 0 as the influence of brightness contrast increases. In the present embodiment, the brightness contrast influence information generation unit 202 generates the brightness contrast influence map by performing filter processing with respect to the input brightness component image in a plurality of different frequency bands, and by compositing together the results of the filter processing. Further details of processing for generating the brightness contrast influence information will be described later.

In the present embodiment, while the brightness contrast influence information generation unit 202 generates the brightness contrast influence map having the same size as the input brightness component image, it may enlarge the generated brightness contrast influence map and output the enlarged map when the brightness contrast influence map has been generated from the reduced brightness component image.

In step S503, the saturation contrast influence information generation unit 203 generates saturation contrast influence information indicating the distribution of degrees of influence of saturation contrast in the HDR image from the color component image separated in step S501. Similarly to the brightness contrast influence information that has been described in step S502, the saturation contrast influence information is in the form of, for example, a map that indicates the degrees of influence of saturation contrast on a per-position basis. In the following description, this map will be referred to as a saturation contrast influence map. In the saturation contrast influence map, a portion that has low saturation and appears faded due to the influence of saturation contrast (a higher degree of influence) has larger signal values.

In the present embodiment, the degree of influence of saturation contrast is represented as a proportion, and the saturation contrast influence map has signal values that indicate larger proportions as the influence increases, with a portion that is not influenced by saturation contrast corresponding to a scale factor of 1. In the present embodiment, the saturation contrast influence information generation unit 203 generates the saturation contrast influence map by performing filter processing with respect to the input color component image in a plurality of different frequency bands, and by compositing the results of the filter processing. Further details of processing for generating the saturation contrast influence information will be described later.

In the present embodiment, while the saturation contrast influence information generation unit 203 generates the saturation contrast influence map having the same size as the input color component image, it may enlarge the generated saturation contrast influence map and output the enlarged map when the saturation contrast influence map is generated from the reduced color component image.

In step S504, the brightness contrast correction unit 204 performs brightness contrast correction processing with respect to the brightness component image that was separated from the HDR image in step S501 based on the brightness contrast influence map that was generated in step S502. Provided that a signal value at coordinates (x, y) in the brightness component image is I (x, y) and a signal value at coordinates (x, y) in the brightness contrast influence map is Map_I (x, y), a signal value I' (x, y) at coordinates (x, y) in the brightness component image after the brightness contrast correction processing is calculated in accordance with Equation (1).

$$I'(x,y) = I(x,y) + \mathrm{Map\_}I(x,y) \tag{1}$$

As stated earlier, in the brightness contrast influence map, a portion that appears darker due to the influence of brightness contrast has larger signal values. Therefore, the portion that appears dark due to the influence of brightness contrast can be corrected to be bright (the influence of brightness contrast can be alleviated) by adding signal values of the brightness contrast influence map to signal values of the brightness component image.

Note that the processing for correcting the influence of brightness contrast is not limited to the processing for alleviating the influence of brightness contrast. For example, correction may be performed so as to enlarge the influence of brightness contrast by, rather than adding, subtracting signal values of the brightness contrast influence map in Equation (1). By thus making a correction so as to enlarge the influence of brightness contrast, for example, a bright subject can be further emphasized in a night-view scene.

In step S505, the saturation contrast correction unit 205 performs saturation contrast correction processing with respect to the color component image that was separated from the HDR image in step S501 based on the saturation contrast influence map that was generated in step S503. Provided that a signal value at coordinates (x, y) in the color component image is Ct (x, y), Cp (x, y) and a signal value at coordinates (x, y) in the saturation contrast influence map is Map_Ct Cp (x, y), a signal value Ct' (x, y), Cp' (x, y) at coordinates (x, y) in the color component image after the saturation contrast correction processing is calculated in accordance with Equation (2).

$$\left. \begin{array}{l} Ct'(x, y) = Ct(x, y) \times \text{Map\_CtCp}(x, y) \\ Cp'(x, y) = Cp(x, y) \times \text{Map\_CtCp}(x, y) \end{array} \right\} \quad (2)$$

As stated earlier, in the saturation contrast influence map, a portion that appears more shaded due to the influence of saturation contrast has larger signal values. Therefore, the portion that has low saturation and appears shaded due to the influence of saturation contrast can be corrected to have high saturation by multiplying signal values of the color component image by signal values of the saturation contrast influence map.

Note that the processing for correcting the influence of saturation contrast is not limited to the processing for alleviating the influence of saturation contrast. For example, correction may be performed so as to enlarge the influence of saturation contrast by, rather than multiplication, division by signal values of the saturation contrast influence map in Equation (2). By thus making a correction so as to enlarge the influence of saturation contrast, for example, a subject that is more colorful than a background can be further emphasized.

Furthermore, in the foregoing description, it is assumed that the brightness contrast correction processing is performed by adding signal values of the brightness contrast influence map to signal values of the brightness component image, and the saturation contrast correction processing is performed by multiplying signal values of the color component image by signal values of the saturation contrast influence map. However, it is also possible to adopt a configuration in which the brightness contrast influence map is represented by signal values that indicate proportions similarly to the saturation contrast influence map, and the brightness contrast correction processing is performed by multiplying signal values of the brightness component image by signal values of the brightness contrast influence map. Moreover, it is also possible to adopt a configuration in which the saturation contrast influence map is represented by signal values that indicate the degrees of influence similarly to the brightness contrast influence map, and the saturation contrast correction processing is performed by adding signal values of the saturation contrast influence map to signal values of the color component image.

In step S506, the brightness and color combining unit 206 combines (composites) the brightness component image that underwent the brightness contrast correction processing in step S504 and the color component image that underwent the saturation contrast correction processing in step S505. In the present embodiment, the brightness and color combining unit 206 combines the brightness component image (I image) that underwent the brightness contrast correction processing and the color component image (Ct image, Cp image) that underwent the saturation contrast correction processing, thereby generating an ICtCp image. Then, the brightness and color combining unit 206 converts the combined ICtCp image into an RGB image or a YUV image.

Through the foregoing processing, contrast influence information indicating the distribution of degrees of influence of contrast can be generated from the input HDR image, and the HDR image (corrected image) that underwent contrast correction (the influence of contrast has been alleviated or enlarged) can be generated.

Note that in the foregoing description, it is assumed that the contrast correction processing is performed with respect to both of the brightness component image and the color component image that were separated from the HDR image in step S501. However, the contrast correction processing may be performed with respect to only one of the brightness component image and the color component image. For example, assume a case where the contrast correction processing is performed with respect to the brightness component image, and the contrast correction processing is not performed with respect to the color component image. In this case, processing of steps S503 and S505 is omitted, and processing for combining the brightness component image that underwent the brightness contrast correction processing in step S504 and the color component image that was separated in step S501 is performed in step S506.

Figure 3:
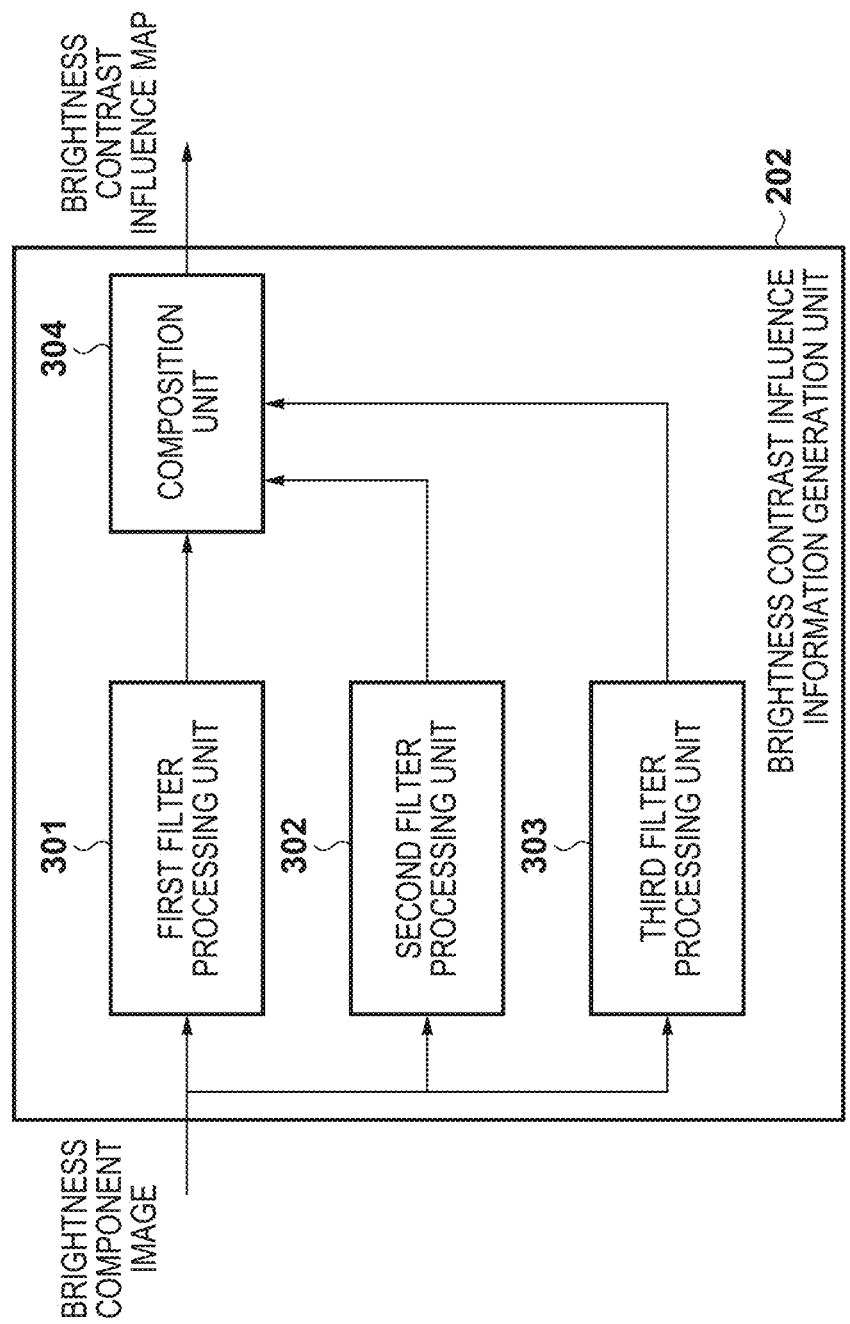
FIG. 3 is a block diagram showing a detailed configuration of a brightness contrast influence information generation unit 202.
Figure 6:
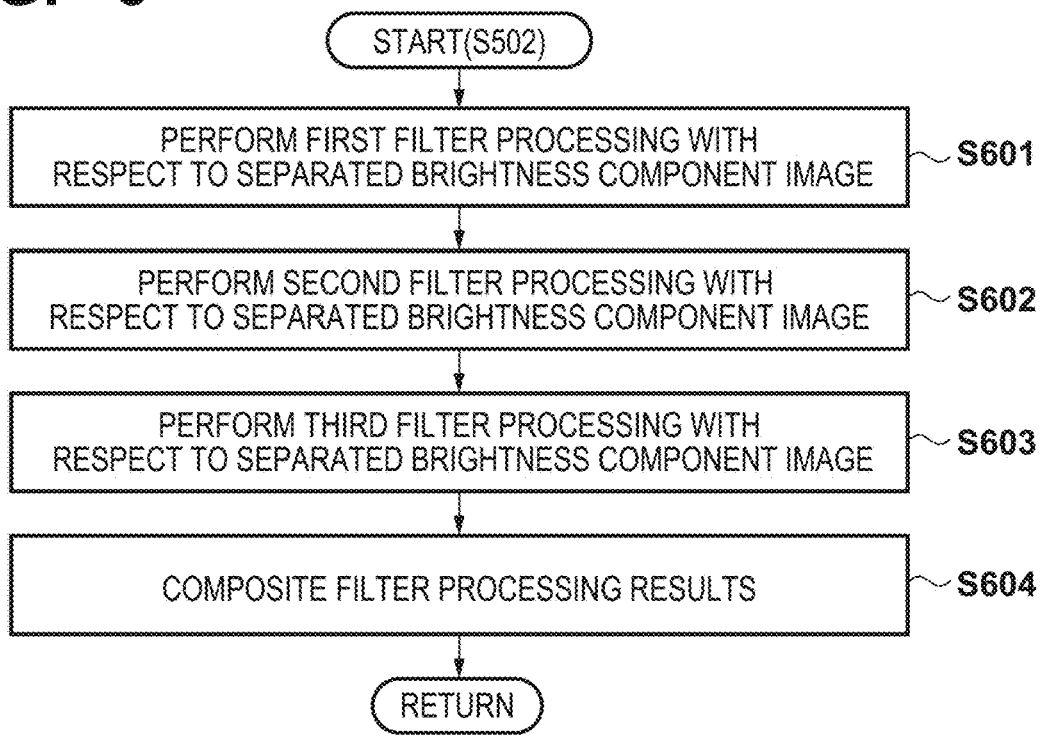
FIG. 6 is a flowchart showing the details of processing of step S502 in FIG. 5 (processing executed by the brightness contrast influence information generation unit 202).

Next, a description is given of the details of processing of step S502 in FIG. 5 (processing for generating the brightness contrast influence information) with reference to FIG. 3 and FIG. 6. As stated earlier, in the present embodiment, the brightness contrast influence map is used as an example of the brightness contrast influence information.

FIG. 3 is a block diagram showing a detailed configuration of the brightness contrast influence information generation unit 202. The brightness contrast influence information generation unit 202 includes a first filter processing unit 301, a second filter processing unit 302, a third filter processing unit 303, and a composition unit 304. The brightness and color separation unit 201 inputs the brightness component image to the first filter processing unit 301, second filter processing unit 302, and third filter processing unit 303. The composition unit 304 outputs the brightness contrast influence map to the brightness contrast correction unit 204.

FIG. 6 is a flowchart showing the details of processing of step S502 in FIG. 5 (processing executed by the brightness contrast influence information generation unit 202).

In step S601, the first filter processing unit 301 performs first filter processing in a first frequency band with respect to the brightness component image input from the brightness and color separation unit 201. The details of the first filter processing will be described later.

In step S602, the second filter processing unit 302 performs second filter processing in a second frequency band, which differs from the first frequency band, with respect to the brightness component image input from the brightness and color separation unit 201. The details of the second filter processing will be described later.

In step S603, the third filter processing unit 303 performs third filter processing in a third frequency band, which differs from the first frequency band and the second frequency band, with respect to the brightness component image input from the brightness and color separation unit 201. The details of the third filter processing will be described later.

In step S604, the composition unit 304 composites together the results of the first filter processing, second filter processing, and third filter processing. Provided that signal values of the results of the first filter processing, second filter processing, and third filter processing at coordinates (x, y) are $F_1$ (x, y), $F_2$ (x, y), and $F_3$ (x, y), respectively, a signal value Map_I (x, y) at coordinates (x, y) after the composition processing is calculated in accordance with the following Equation (3).

$$\text{Map\_I}(x,y) = \text{Max}[F_1(x,y), F_2(x,y), F_3(x,y)] \quad (3)$$

Note that although the largest values of the plurality of results of filter processing are selected as signal values after the composition processing in the example of Equation (3), it is possible to adopt a configuration in which signal values after the composition processing are generated by calculating average values of the plurality of results of filter processing as in the following Equation (4).

$$\text{Map\_I}(x,y) = (F_1(x,y) + F_2(x,y) + F_3(x,y)) \div 3 \quad (4)$$

The brightness contrast influence map is generated through the foregoing processing.

Note that although filter processing is performed in three different frequency bands in the example of FIG. 3 and FIG. 6, the number of frequency bands is not limited to three, and may be any number equal to or larger than two (a plural number). In other words, the brightness contrast influence information generation unit 202 (a first filter unit) individually applies each of a plurality of filters for brightness with different frequency bands to the brightness component image, thereby generating a plurality of results of filter processing for brightness. The brightness contrast influence information generation unit 202 is configured to include filter processing units that correspond in number to the number of frequency bands, and the composition unit 304 composites together the plurality of results of filter processing for brightness from the plurality of filter processing units included in the brightness contrast influence information generation unit 202.

Figure 4:
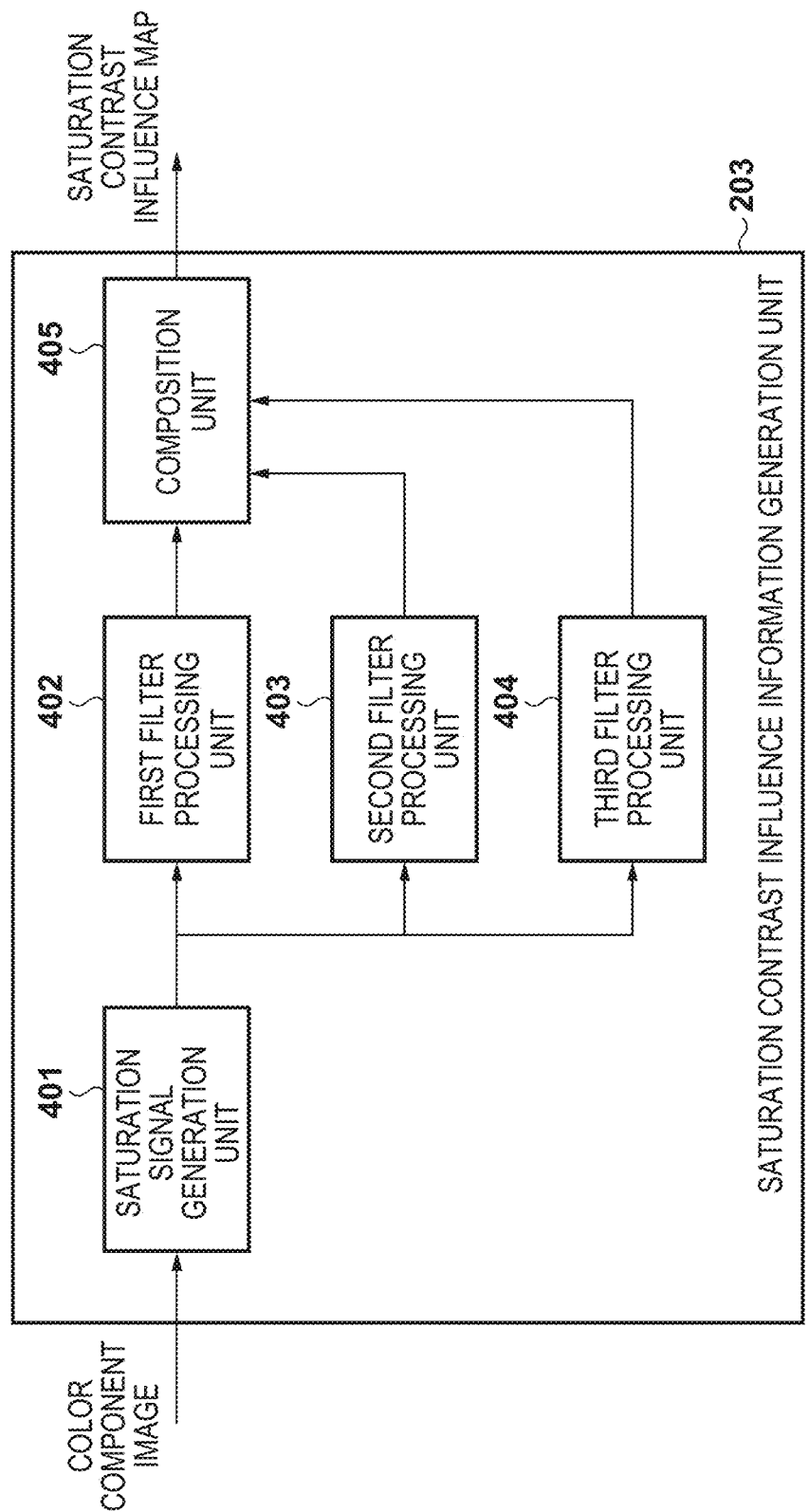
FIG. 4 is a block diagram showing a detailed configuration of a saturation contrast influence information generation unit 203.
Figure 7:
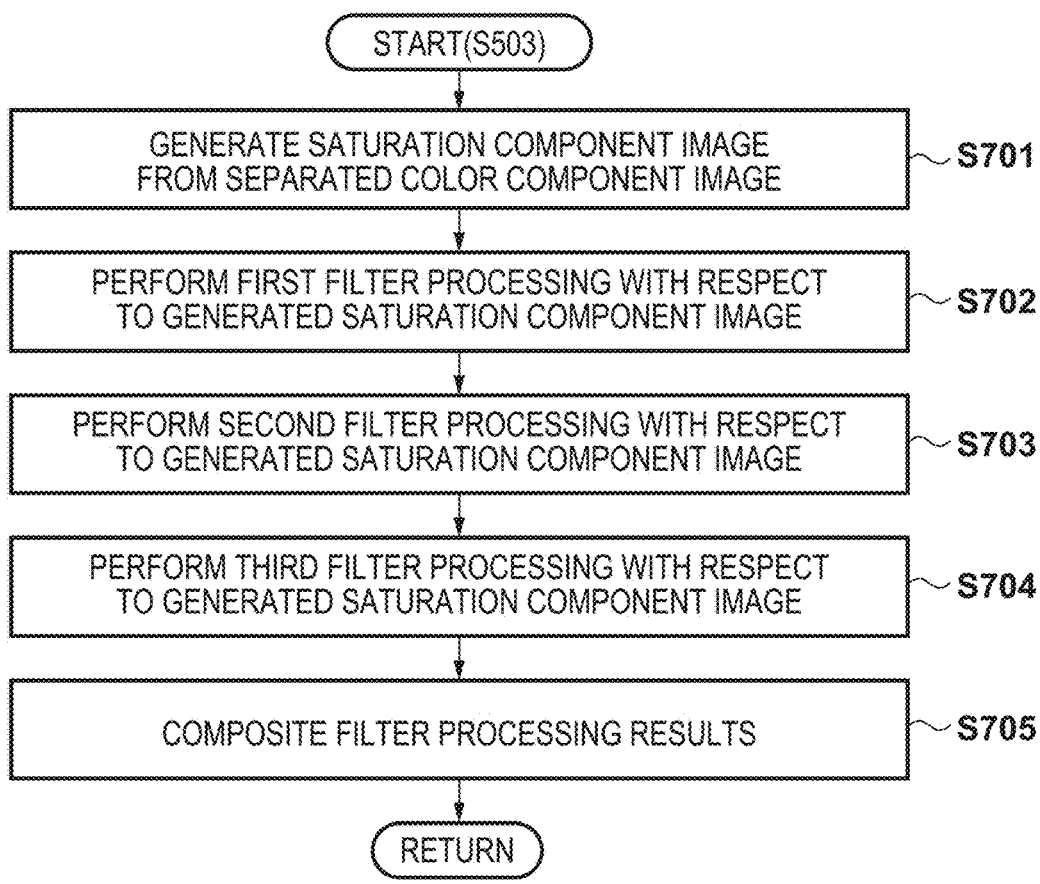
FIG. 7 is a flowchart showing the details of processing of step S503 in FIG. 5 (processing executed by the saturation contrast influence information generation unit 203).

Next, a description is given of the details of processing of step S503 in FIG. 5 (processing for generating the saturation contrast influence information) with reference to FIG. 4 and FIG. 7. As stated earlier, in the present embodiment, the saturation contrast influence map is used as an example of the saturation contrast influence information. The processing for generating the saturation contrast influence information differs from the processing for generating the brightness contrast influence information in that a saturation component image is generated from the input color component image and filter processing is performed with respect to the generated saturation component image, rather than performing filter processing directly with respect to the input color component image.

FIG. 4 is a block diagram showing a detailed configuration of the saturation contrast influence information generation unit 203. The saturation contrast influence information generation unit 203 includes a saturation signal generation unit 401, a first filter processing unit 402, a second filter processing unit 403, a third filter processing unit 404, and a composition unit 405. The brightness and color separation unit 201 inputs the color component image to the saturation signal generation unit 401. The composition unit 405 outputs the saturation contrast influence map to the saturation contrast correction unit 205.

FIG. 7 is a flowchart showing the details of processing of step S503 in FIG. 5 (processing executed by the saturation contrast influence information generation unit 203).

In step S701, the saturation signal generation unit 401 generates a saturation component image from the input color component image. In the present embodiment, a Ct, Cp image is used as the color component image. Provided that a signal value at coordinates (x, y) in the Ct, Cp image is Ct (x, y), Cp (x, y), a signal value S (x, y) at coordinates (x, y) in the saturation component image is calculated in accordance with the following Equation (5).

$$S(x,y) = \sqrt{Ct(x,y)^2 + Cp(x,y)^2} \quad (5)$$

In step S702, the first filter processing unit 402 performs first filter processing in a first frequency band with respect to the saturation component image input from the saturation signal generation unit 401. Although the first filter processing in step S702 is similar to the first filter processing in step S601, the first frequency band in step S702 may be the same as or different from the first frequency band in step S601.

In step S703, the second filter processing unit 403 performs second filter processing in a second frequency band, which differs from the first frequency band, with respect to the saturation component image input from the saturation signal generation unit 401. Although the second filter processing in step S703 is similar to the second filter processing in step S602, the second frequency band in step S703 may be the same as or different from the second frequency band in step S602.

In step S704, the third filter processing unit 404 performs third filter processing in a third frequency band, which differs from the first frequency band and the second frequency band, with respect to the saturation component image input from the saturation signal generation unit 401. Although the third filter processing in step S704 is similar to the third filter processing in step S603, the third frequency band in step S704 may be the same as or different from the third frequency band in step S603.

In step S705, the composition unit 405 composites together the results of the first filter processing, second filter processing, and third filter processing. The composition method used here is similar to the composition method in step S604.

The saturation contrast influence map is generated through the foregoing processing.

Note that although filter processing is performed in three different frequency bands in the example of FIG. 4 and FIG. 7, the number of frequency bands is not limited to three, and may be any number equal to or larger than two (a plural number). In other words, the saturation contrast influence information generation unit 203 (a second filter unit) individually applies each of a plurality of filters for saturation with different frequency bands to the saturation component image, thereby generating a plurality of results of filter processing for saturation. The saturation contrast influence information generation unit 203 is configured to include filter processing units that correspond in number to the number of frequency bands, and the composition unit 405 composites the plurality of results of filter processing for saturation from the plurality of filter processing units included in the saturation contrast influence information generation unit 203.

Next, the details of the filter processing in steps S601 to S603 of FIG. 6 and steps S702 to S704 of FIG. 7 will be described with reference to FIGS. 9A to 9C and FIGS. 10A to 10C. As stated earlier, the filter processing in steps S702 to S704 of FIG. 7 is similar to the filter processing in steps S601 to S603 of FIG. 6, and in either filter processing, spatial filters based on the visual characteristic of a human related to contrast detection are used. However, as stated earlier, the frequency bands of the filters in steps S702 to S704 of FIG. 7 are not necessarily the same as the frequency bands of the filters in steps S601 to S603 of FIG. 6.

Figure 9A:
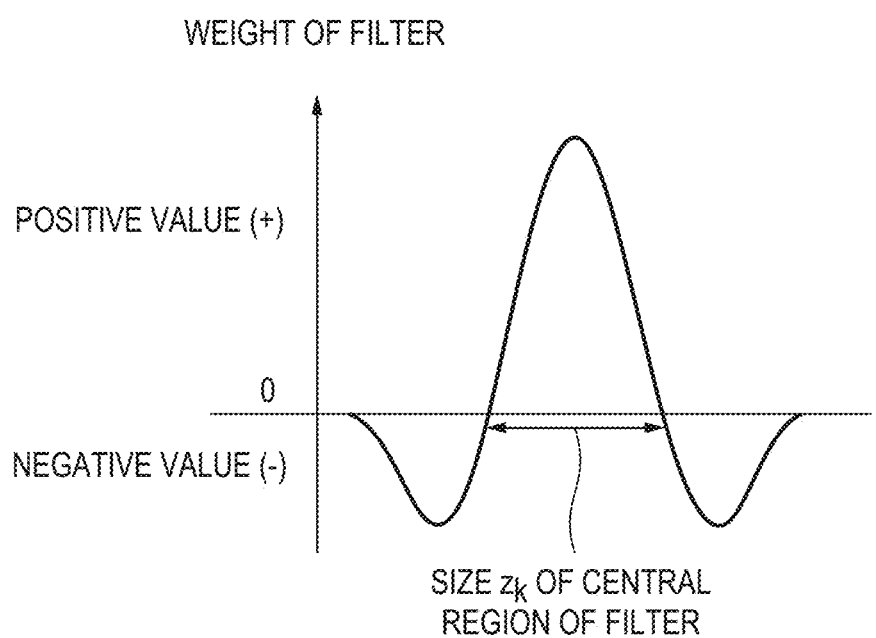
FIGS. 9A and 9B are conceptual diagrams of filters that are used in generating contrast influence information.

FIG. 9A is a diagram of one-dimensional representation of a filter that utilizes a Gaussian second-order differential function based on the characteristic of contrast detection among the visual characteristic of a human. The aforementioned filter is of a sombrero type that takes a difference between a central region and peripheral regions. As indicated by Equation (6), the foregoing filter result corresponding to a target pixel (x, y) in the input image is represented as $Gf_k$ (x, y).

$$r_{ij} = \sqrt{(x-i)^2 + (y-j)^2}$$
$$w_{ij} = -\left\{-\frac{1}{\pi\sigma_k^4}\left(1 - \frac{r_{ij}^2}{2\sigma_k^2}\right)e^{-\frac{r_{ij}^2}{2\sigma_k^2}}\right\}$$
$$Gf_k(x, y) = \frac{\sum_i \sum_j w_{ij} pix(i, j)}{\sum_i \sum_j w_{ij}} \quad (6)$$

In Equation (6), $r_{ij}$ is the distance from the target pixel (x, y) for the filter to coordinates (i, j), $\sigma_k$ is a filter parameter, $w_{ij}$ is the weight of the filter at coordinates (i, j), and pix (i, j) is a signal value at coordinates (i, j) in the input image. k is an identification number of the filter, and when there are n filters, k=0, 1, 2, . . . , n−1.

Figure 9B:
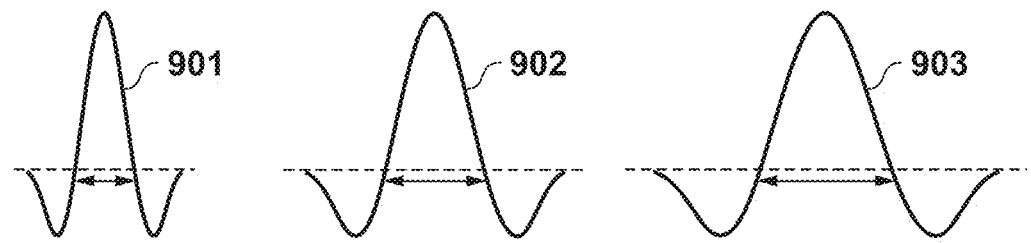

$\sigma_k$ changes in accordance with the frequency band used in the detection. FIG. 9B is one-dimensional representations of the shapes of the filters based on Equation (6) for a case where three different frequency bands are used in the detection. The characteristics of the filters are such that the larger the value of $\sigma_k$, the lower the frequency band used in the detection; as $\sigma_k$ increases from a small value to a large value, the filters change in shape as indicated by a filter 901, a filter 902, and a filter 903 in FIG. 9B.

In the present embodiment, a signal value $F_k$ (x, y) of the results of filter processing is generated by performing the computation of the following Equation (7) using the filters of Equation (6).

$$F_k(x,y) = -1 \times (Gf_k(x,y) - pix(x,y)) \times gain_k \quad (7)$$

In Equation (7), pix (x, y) is a signal value at coordinates (x, y) in the input image, and $gain_k$ is a gain conforming to the frequency band used in the detection; the method of calculating $gain_k$ will be described later.

Furthermore, when the results of filter processing are represented as proportions rather than difference values, the results of filter processing can be generated by performing computation of the following Equation (8).

$$F_k(x, y) = \frac{-1 \times (Gf_k(x, y) - pix(x, y)) \times gain_k + pix(x, y)}{pix(x, y)} \quad (8)$$

In the present embodiment, Equation (7) is used in generating the brightness contrast influence map, and Equation (8) is used in generating the saturation contrast influence map. A brightness component signal value I (x, y) is used as pix (x, y) in generating the brightness contrast influence map, and a saturation component signal value S (x, y) is used as pix (x, y) in generating the saturation contrast influence map.

Note that in generating the brightness contrast influence map, instead of using the brightness component signal value I (x, y) as is as pix (x, y), a signal obtained by converting the brightness component signal value I (x, y) to linear based on the monitor gamma Electro-Optical Transfer Function (EOTF) described in ST 2084 may be used as pix (x, y) as shown in Equation (9).

$$p\_in = \left(\frac{p\_out^{\frac{1}{m_2}} - c_1}{c_2 - c_3 \cdot p\_out^{\frac{1}{m_2}}}\right)^{\frac{1}{m_1}} \quad (9)$$

$m_1 = 0.1593017578125, m_2 = 78.84375,$ $c_1 = 0.8359375, c_2 = 18.8515625, c_3 = 18.6875$

In Equation (9), p_out is a signal obtained by normalizing the brightness component signal value I (x, y) to 0.0-1.0, where 0.1 corresponds to an upper limit value based on the number of output bits, and 0.0 corresponds to a lower limit value based on the number of output bits. For example, when the number of output bits is 10 bits, the upper limit value is 1023, and the lower limit value is 0. p_in is a signal obtained by converting the brightness component signal value I (x, y) to linear, and has been normalized to 0.0-1.0. When a converted signal is expressed using 10 bits, 0.0 is treated as 0, and 1.0 is treated as 1023.

FIG. 9C is a conceptual diagram of the results of performing filter processing with respect to the input image in the aforementioned three different frequency bands shown in FIG. 9B. A first filter processing result 905 denotes the result of performing filter processing with respect to an input image 904 using the filter 901 corresponding to the first frequency band. A second filter processing result 906 denotes the result of performing filter processing with respect to the input image 904 using the filter 902 corresponding to the second frequency band. A third filter processing result 907 denotes the result of performing filter processing with respect to the input image 904 using the filter 903 corresponding to the third frequency band. The high-frequency band of the filter 901 enables detection of the influence of contrast in a portion near the boundary between a person and a background, and the low-frequency band of the filter 903 enables detection even inside the face of the person. By performing filter processing with respect to the input image in a plurality of frequency bands using the filters that utilize the aforementioned Gaussian second-order differential function, the influences of contrast of subjects with different sizes can be detected.

Next, the method of calculating the gain $gain_k$ conforming to a frequency band, which is used in the aforementioned Equation (7) and Equation (8), will be described in detail. First, parameters that are necessary for explaining the method of calculating the gain $gain_k$ will be described.

Figure 10A:
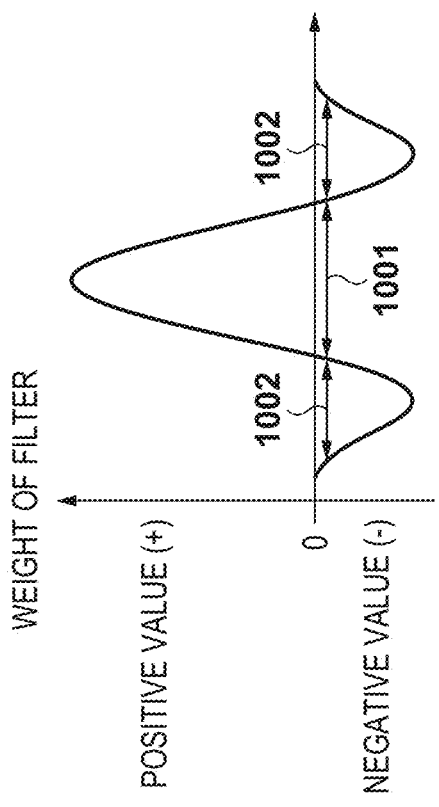
FIGS. 10A to 10C are diagrams illustrating a gain of a filter that is used in generating contrast influence information.

FIG. 10A is a diagram of the result of dividing a filter that utilizes the aforementioned Gaussian second-order differential function into regions. A region that is indicated by reference sign 1001 and equivalent to a positive region of the filter is regarded as a central region of the filter, and regions that are indicated by reference sign 1002 and equivalent to negative regions of the filter are regarded as peripheral regions of the filter. It is assumed that average values of luminances in ranges that are equivalent to the central region 1001 and the peripheral regions 1002 are respectively used as a central luminance $x_k$ of the filter and a peripheral luminance $y_k$ of the filter, and the size of the range of the central region 1001 is $z_k$.

In the present embodiment, gain $gain_k$ conforming to a frequency band is a gain $f\_gain_k$ ($x_k$, $y_k$, $z_k$) based on the central luminance $x_k$, the peripheral luminance $y_k$, and the size $z_k$ of the central region of the filter, and is represented as Equation (10).

$$gain_k = f\_gain_k(x_k, y_k, z_k) \quad (10)$$

A description is now given of the gain $f\_gain_k$ ($x_k$, $y_k$, $z_k$).

Figure 10B:
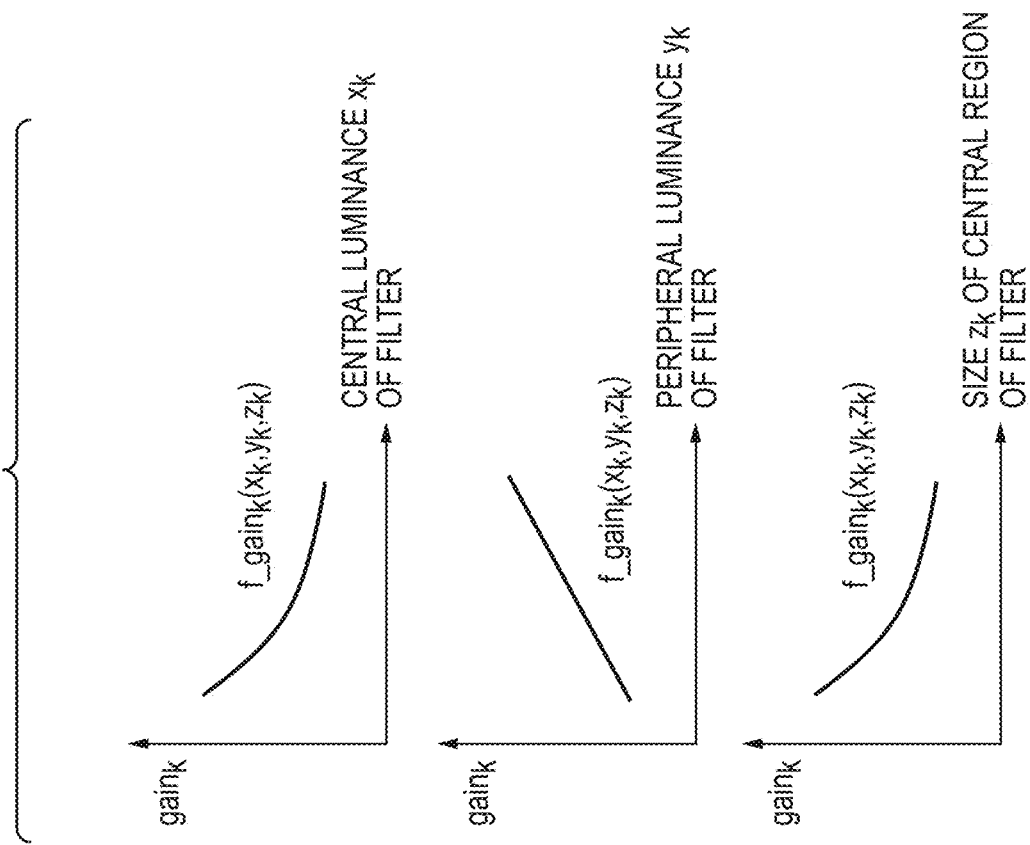

The gain $f\_gain_k$ ($x_k$, $y_k$, $z_k$) is a preset table with which one gain is determined given the three parameters: the central luminance $x_k$ and the peripheral luminance $y_k$ of the filter, and the size $z_k$ of the central region of the filter. FIG. 10B is a diagram showing the gain $gain_k$ for a case where one parameter changes while the other two parameters are fixed. The property of the table is such that the gain decreases as the central luminance $x_k$ of the filter increases, the gain increases as the peripheral luminance $y_k$ of the filter increases, and the gain decreases as the size $z_k$ of the central region of the filter increases. As such, the table $f\_gain_k$ ($x_k$, $y_k$, $z_k$) is a table with which the gain changes based on the influence of contrast.

Although the gain $gain_k$ conforming to a frequency band is defined as $f\_gain_k$ ($x_k$, $y_k$, $z_k$) in the foregoing description, $gain_k$ may be defined using other methods. For example, the gain $gain_k$ may be defined using a gain $scn\_gain_k$ ($z_k/M$) in the following Equation (11), with which a correction is made while placing priority on the influence of contrast of a main subject based on a scene.

$$gain_k = f\_gain_k \times scn\_gain_k\left(\frac{z_k}{M}\right) \quad (11)$$

In Equation (11), M is the size of the main subject, and $z_k$ is the size of the central region of the filter. The size M of the main subject is the size of the result of detection of a subject region (e.g., the frame size of the result of facial detection).

Figure 10C:
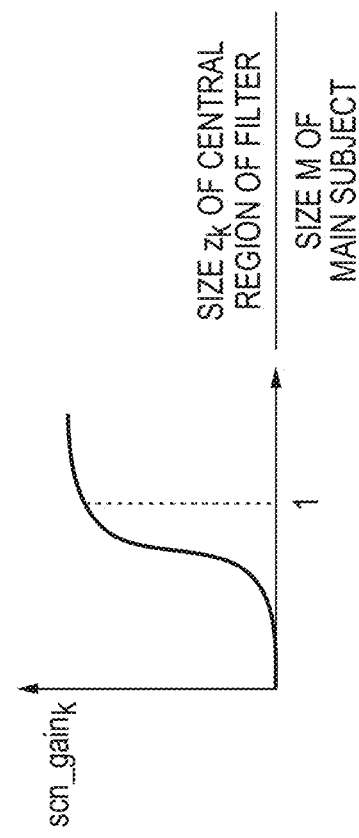

FIG. 10C is a diagram showing $scn\_gain_k$ ($z_k/M$) for a case where the proportion of the size $z_k$ of the central region of the filter to the size M of the main subject is represented by a horizontal axis. The calculation of $scn\_gain_k$ ($z_k/M$) can be performed using a preset table shown in FIG. 10C. The characteristic of correction of the influence of contrast using a filter in which the size $z_k$ of a central region of the filter is smaller than the size M of a main subject is that shadows and the like within the main subject are also corrected. Therefore, when the proportion of the size $z_k$ of the central region of the filter to the size M of the main subject is small, a gain that can leave shadows of the main subject can be obtained by reducing $scn\_gain_k$ ($z_k/M$).

Regarding the method of calculating the gain $gain_k$, although the above has described the method of calculating the gain that is used in generating the brightness contrast influence map, the same gain that is used in generating the brightness contrast influence map can be used also in generating the saturation contrast influence map. Alternatively, the gain that is used in generating the saturation contrast influence map may be calculated separately by replacing the central luminance and the peripheral luminance in the above description with the central saturation and the peripheral saturation.

Although the method of calculating the gain $gain_k$ according to the present embodiment has been described thus far, the method of calculating $gain_k$ is not limited to the above-described method. For example, a fixed value may be used as the gain.

As described above, according to the first embodiment, the image capturing apparatus 100 individually applies each of a plurality of filters for brightness with different frequency bands to the brightness component image indicating the distribution of brightness components in the HDR image, thereby generating a plurality of results of filter processing for brightness. The plurality of filters for brightness are spatial filters based on the visual characteristic of a human related to contrast detection. Then, by compositing together the plurality of results of filter processing for brightness, the image capturing apparatus 100 generates the brightness contrast influence information indicating the distribution of degrees of influence of brightness contrast in the HDR image.

Furthermore, the image capturing apparatus 100 individually applies each of a plurality of filters for saturation with different frequency bands to the saturation component image indicating the distribution of saturation components in the HDR image, thereby generating a plurality of results of filter processing for saturation. The plurality of filters for color are spatial filters based on the visual characteristic of a human related to contrast detection. Then, by compositing together the plurality of results of filter processing for saturation, the image capturing apparatus 100 generates the saturation contrast influence information indicating the distribution of degrees of influence of saturation contrast in the HDR image.

In this way, information indicating the distribution of degrees of influence of contrast in an image can be generated.

Second Embodiment

A second embodiment will be described in relation to a configuration in which processing for correcting the influence of contrast is performed with respect to an SDR image converted from an HDR image based on contrast influence information generated from the HDR image. In the present embodiment, a basic configuration of the image capturing apparatus 100 is similar to that of the first embodiment. The following mainly describes differences from the first embodiment.

Figure 11:
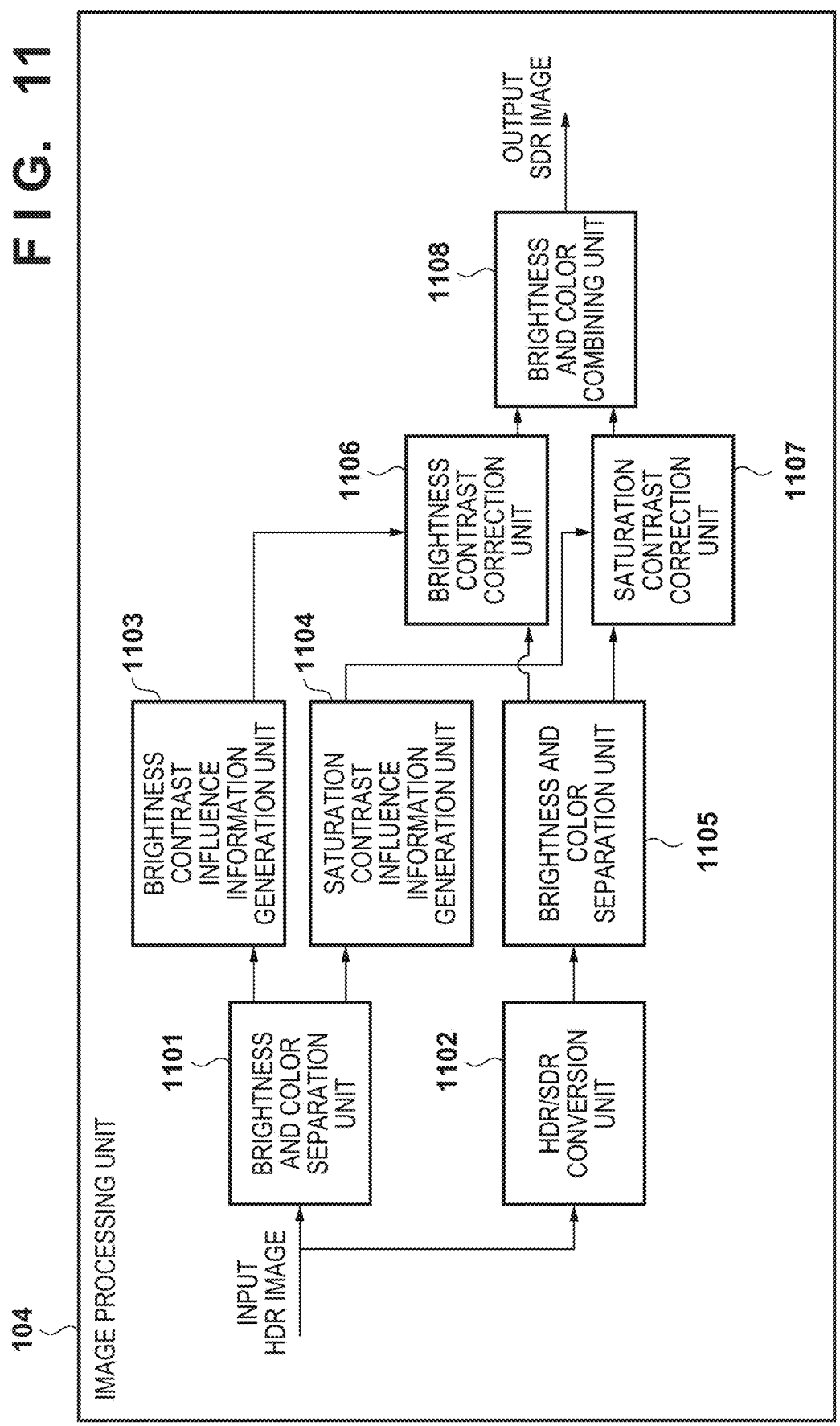
FIG. 11 is a block diagram showing a detailed configuration of a portion that is involved in contrast correction processing in the image processing unit 104 according to a second embodiment.

FIG. 11 is a block diagram showing a detailed configuration of a portion that is involved in contrast correction processing in the image processing unit 104 according to the second embodiment. The image processing unit 104 includes a brightness and color separation unit 1101, an HDR/SDR conversion unit 1102, a brightness contrast influence information generation unit 1103, and a saturation contrast influence information generation unit 1104. The image processing unit 104 also includes a brightness and color separation unit 1105, a brightness contrast correction unit 1106, a saturation contrast correction unit 1107, and a brightness and color combining unit 1108.

An HDR image that has been developed through normal signal processing of the image processing unit 104 is input to the brightness and color separation unit 1101, and an SDR image that has undergone the contrast correction processing is output from the brightness and color combining unit 1108. The input HDR image is, for example, an HDR image that has been generated by the image processing unit 104 developing a RAW image captured by the image capturing unit 102. The development is performed using, for example, the gamma of ST 2084 (PQ gamma) and the color space of Rec.

2020. The output SDR image is an image that has been developed using, for example, the sRGB gamma and the sRGB gamut. Furthermore, the input image and the output image are composed of RGB or YUV.

Note that similarly to the first embodiment, the input image is not limited to the HDR image. Furthermore, the output image is not limited to the SDR image, and may be an image of any format as long as it is an image that has a smaller dynamic range for brightness components and color components than the input image.

Figure 13:
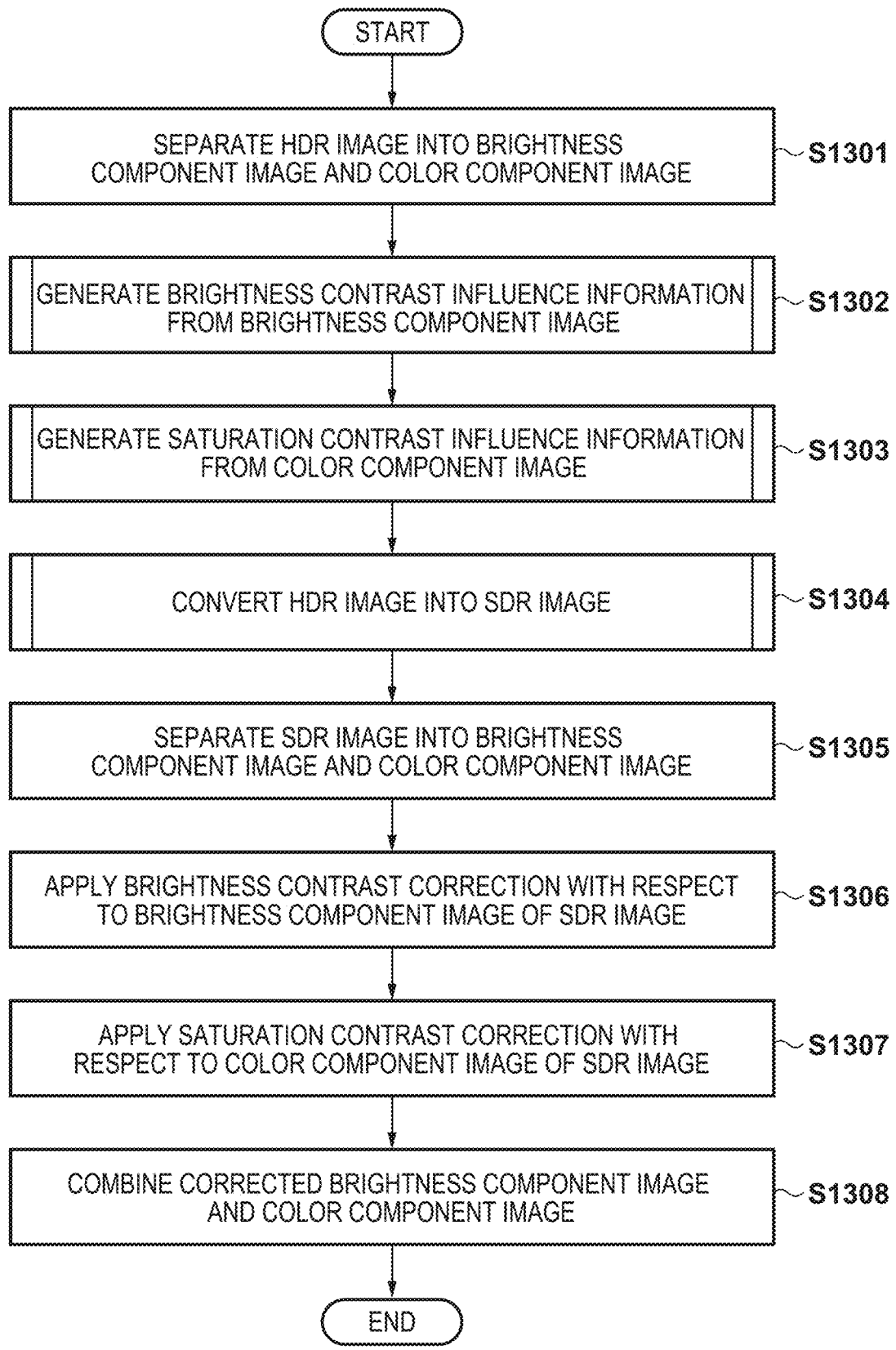
FIG. 13 is a flowchart of the contrast correction processing executed by the image processing unit 104 according to the second embodiment.

FIG. 13 is a flowchart of the contrast correction processing executed by the image processing unit 104 according to the second embodiment. The processing of the present flowchart is started when an HDR image to be processed is input to the brightness and color separation unit 1101. Note that the system control unit 106 controls the contrast correction processing by controlling respective components of the image capturing apparatus 100, including respective components of the image processing unit 104, in accordance with a control program stored in a ROM (not shown) as necessary, unless specifically stated otherwise.

In steps S1301 to S1303, the brightness and color separation unit 1101, the brightness contrast influence information generation unit 1103, and the saturation contrast influence information generation unit 1104 perform processing that is similar to that of steps S501 to S503 in FIG. 5.

In step S1304, the HDR/SDR conversion unit 1102 performs processing for converting the HDR image into an SDR image (image generation processing for generating the SDR image from the HDR image). The details of processing of step S1304 will be described later.

In step S1305, the brightness and color separation unit 1105 separates the SDR image generated in step S1304 into a brightness component image and a color component image. The details of the separation method are similar to those of step S501 in FIG. 5 and step S1301 in FIG. 13.

In step S1306, the brightness contrast correction unit 1106 performs brightness contrast correction processing with respect to the brightness component image, which was separated from the SDR image in step S1305, based on the brightness contrast influence map generated in step S1302. The brightness contrast correction processing according to the present embodiment differs from step S504 of FIG. 5 according to the first embodiment. Provided that a signal value at coordinates (x, y) in the brightness component image is I (x, y) and a signal value at coordinates (x, y) in the brightness contrast influence map is Map_I (x, y), a signal value I' (x, y) at coordinates (x, y) in the brightness component image after the brightness contrast correction processing according to the present embodiment is represented by Equation (12).

$$I'(x,y) = I(x,y) - \text{Map}\_I(x,y) \tag{12}$$

As stated earlier, in the brightness contrast influence map, a portion that appears darker due to the influence of brightness contrast has larger signal values. Therefore, by subtracting signal values of the brightness contrast influence map from signal values of the brightness component image, contrast can be added to a portion that appears weak in contrast based on brightness contrast compared to the HDR image due to the conversion from the HDR image into the SDR image.

Note that the processing for correcting the influence of brightness contrast is not limited to the processing for enlarging the influence of brightness contrast. For example, correction may be performed so as to alleviate the influence of brightness contrast by, rather than subtracting, adding signal values of the brightness contrast influence map in Equation (12). In this way, correction may be performed also with respect to the SDR image so as to alleviate the influence of brightness contrast similarly to the first embodiment.

In step S1307, the saturation contrast correction unit 1107 performs saturation contrast correction processing with respect to the color component image, which was separated from the SDR image in step S1305, based on the saturation contrast influence map generated in step S1303. The saturation contrast correction processing according to the present embodiment differs from step S505 of FIG. 5 according to the first embodiment. Provided that a signal value at coordinates (x, y) in the color component image is Ct (x, y), Cp (x, y) and a signal value at coordinates (x, y) in the saturation contrast influence map is Map_Ct Cp (x, y), a signal value Ct' (x, y), Cp' (x, y) at coordinates (x, y) in the color component image after the saturation contrast correction processing according to the present embodiment is represented by Equation (13).

$$\left. \begin{array}{l} Ct'(x, y) = Ct(x, y) \times \dfrac{1}{\text{Map}\_CtCp(x, y)} \\ Cp'(x, y) = Cp(x, y) \times \dfrac{1}{\text{Map}\_CtCp(x, y)} \end{array} \right\} \tag{13}$$

As stated earlier, in the saturation contrast influence map, a portion that appears more shaded due to the influence of saturation contrast has larger signal values. Therefore, by multiplying signal values of the color component image by signal values of the saturation contrast influence map, saturation can be emphasized in a portion that appears weak in saturation based on saturation contrast compared to the HDR image due to the conversion from the HDR image into the SDR image.

Note that the processing for correcting the influence of saturation contrast is not limited to the processing for enlarging the influence of saturation contrast. For example, correction may be performed so as to alleviate the influence of saturation contrast by, rather than division, multiplication by signal values of the saturation contrast influence map in Equation (13). In this way, correction for alleviating the influence of saturation contrast may be performed also with respect to the SDR image similarly to the first embodiment.

In step S1308, the brightness and color combining unit 1108 combines (composites) the brightness component image that underwent the brightness contrast correction processing in step S1106 and the color component image that underwent the saturation contrast correction processing in step S1107. The details of the combining method are similar to those of step S506 in FIG. 5.

Through the foregoing processing, contrast influence information indicating the distribution of degrees of influence of contrast can be generated from the input HDR image, and the SDR image (corrected image) that underwent contrast correction (the influence of contrast has been enlarged or alleviated) can be generated.

Note that in the foregoing description, it is assumed that the contrast correction processing is performed with respect to both of the brightness component image and the color component image that were separated from the SDR image in step S1305. However, the contrast correction processing may be performed with respect to only one of the brightness component image and the color component image. For example, assume a case where the contrast correction processing is performed with respect to the brightness component image, and the contrast correction processing is not performed with respect to the color component image. In this case, processing of steps S1303 and S1307 is omitted, and processing for combining the brightness component image that underwent the brightness contrast correction processing in step S1306 and the color component image that was separated in step S1305 is performed in step S1308.

Figure 12:
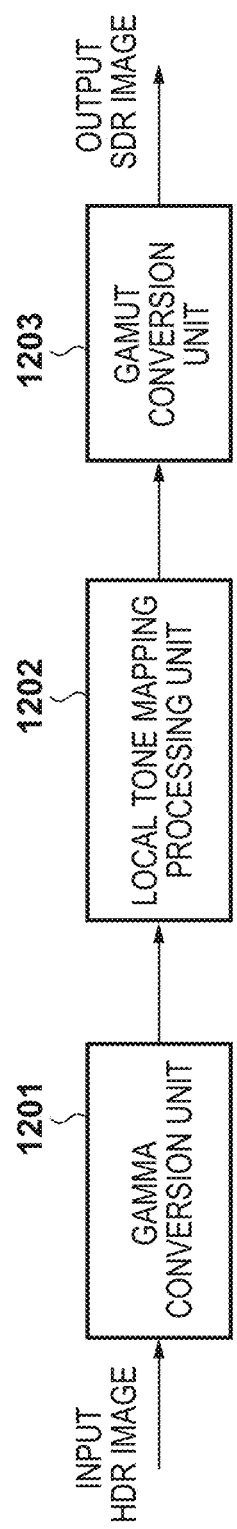
FIG. 12 is a block diagram showing a detailed configuration of an HDR/SDR conversion unit 1102.
Figure 14:
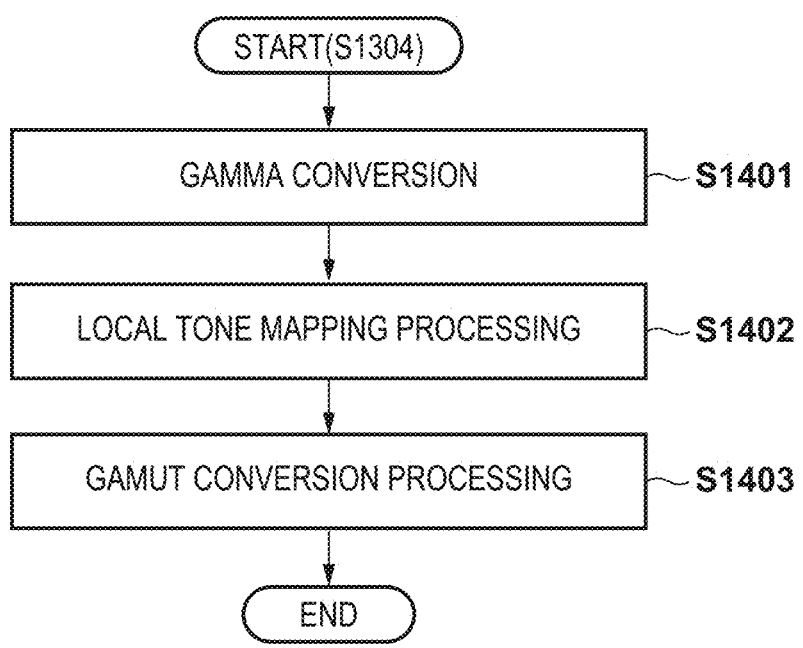
FIG. 14 is a flowchart showing the details of processing of step S1304 in FIG. 13 (processing for converting an HDR image into an SDR image).

Next, a description is given of the details of processing of step S1304 in FIG. 13 (processing for converting the HDR image into the SDR image) with reference to FIG. 12 and FIG. 14.

FIG. 12 is a block diagram showing a detailed configuration of the HDR/SDR conversion unit 1102. The HDR/SDR conversion unit 1102 includes a gamma conversion unit 1201, a local tone mapping processing unit 1202, and a gamut conversion unit 1203. The input image is the HDR image that has been developed using the PQ gamma described in ST 2084 as the gamma and the color space of Rec. 2020, and the output image is the SDR image that has been developed using the sRGB gamma as the gamma and the sRGB gamut as the color space.

FIG. 14 is a flowchart showing the details of processing of step S1304 in FIG. 13 (processing for converting the HDR image into the SDR image).

In step S1401, the gamma conversion unit 1201 performs gamma conversion corresponding to the SDR image with respect to the input HDR image. The gamma conversion refers to processing for restoring the gamma applied to the HDR image to a linear space, thereby converting it to the gamma that should be applied to the SDR image.

First, in order to restore the gamma applied to the HDR image to a linear space, the gamma conversion unit 1201 applies the monitor gamma (EOTF), which is the reverse characteristic of the gamma applied to the HDR image. In the present embodiment, the monitor gamma (EOTF) described in ST 2084, which is shown in the aforementioned Equation (9), is applied. p_out in the aforementioned Equation (9) is an R, G, B signal obtained by normalizing an output signal of the HDR image to 0.0-1.0, where 1.0 corresponds to an upper limit value based on the number of output bits, and 0.0 corresponds to a lower limit value. For example, when the number of output bits is 10 bits, the upper limit value is 1023, and the lower limit value is 0. p_in is an R, G, B signal obtained by normalizing an input signal resulting from the restoration of the HDR image to the linear space to 0.0-1.0, where 0.0 and 1.0 respectively represent luminance values of 0 cd/m² and 10000 cd/m².

Next, the gamma conversion unit 1201 applies the SDR gamma (OETF) to signal values that have been restored to the linear space. With regard to p_in calculated using the aforementioned Equation (9), 0.0 corresponds to 0 cd/m², and 1.0 corresponds to 10000 cd/m². In order to apply the SDR gamma of later-described Equation (15) to p_in, it is necessary to normalize p_in again so that 0.0 corresponds to 0 cd/m² and 1.0 corresponds to 100 cd/m² as shown in the following Equation (14). p_in' denotes a signal value obtained by performing the normalization again.

$$p\_in' = 100 \times p\_in \quad (14)$$

The gamma conversion can be realized by applying the signal value p_in', which is obtained by performing the normalization again using Equation (14), as p_in in later-described Equation (15). p_in is an R, G, B signal obtained by normalizing a linear input signal to 0.0-1.0, where 0.0 and 1.0 represent luminance values of 0 cd/m² and 100 cd/m², respectively. p_out is an R, G, B signal obtained by normalizing an output signal to 0.0-1.0, where 1.0 corresponds to an upper limit value based on the number of output bits, and 0.0 corresponds to a lower limit value. For example, when the number of output bits is 10 bits, the upper limit value corresponds to 1023, and the lower limit value corresponds to 0.

$$\begin{aligned} &\text{if}(p\_in > 0.003108) && p\_out = 1.055 * p\_in^{(\frac{1}{2.4})} - 0.055 \\ &\text{else} && p\_out = 12.92 \times p\_in \end{aligned} \quad (15)$$

Figure 15:
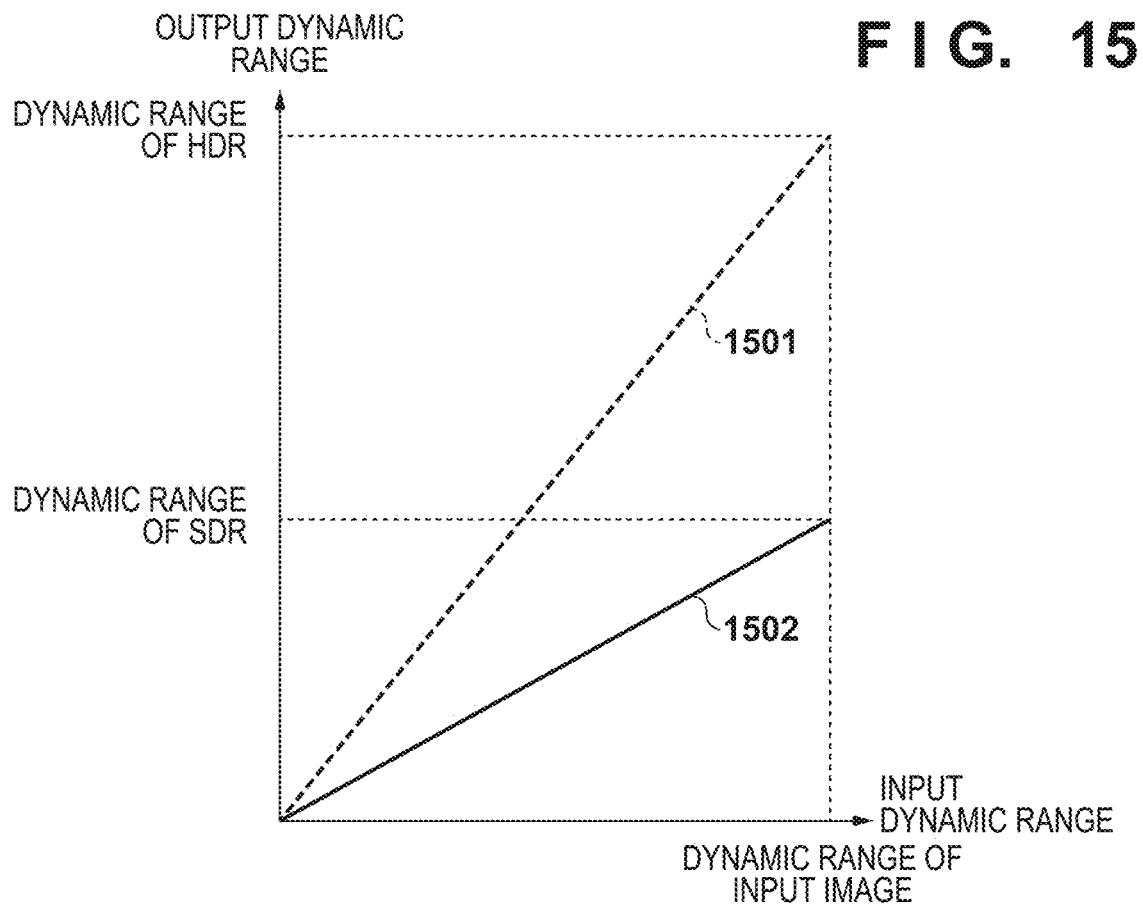
FIG. 15 is a diagram illustrating gamma conversion in a linear space.

FIG. 15 is a diagram illustrating the gamma conversion in the linear space. A horizontal axis corresponds to an input linear signal, and a vertical axis corresponds to an output linear signal. The characteristic 1501 indicated by a dash line represents the input/output characteristic of the HDR image, and the characteristic 1502 indicated by a solid line represents the input/output characteristic of the SDR image after the gamma conversion. As shown in FIG. 15, the input/output characteristic of the SDR image after the gamma conversion is in the form of the input/output characteristic of the HDR image being pressed to linear.

In step S1402, the local tone mapping processing unit 1202 performs local tone mapping processing with respect to the image that underwent the gamma conversion in step S1401. In the local tone mapping processing, processing for increasing contrast in a luminance region that is subject to tone compression and the like is carried out while changing the brightness in a dark portion and a bright portion. As the local tone mapping processing, a common method is used that generates a gain map with which the tone characteristics change locally with use of the results of distinguishing images and regions of different frequency bands, and carries out tone processing with reference to the generated gain map.

Figure 16:
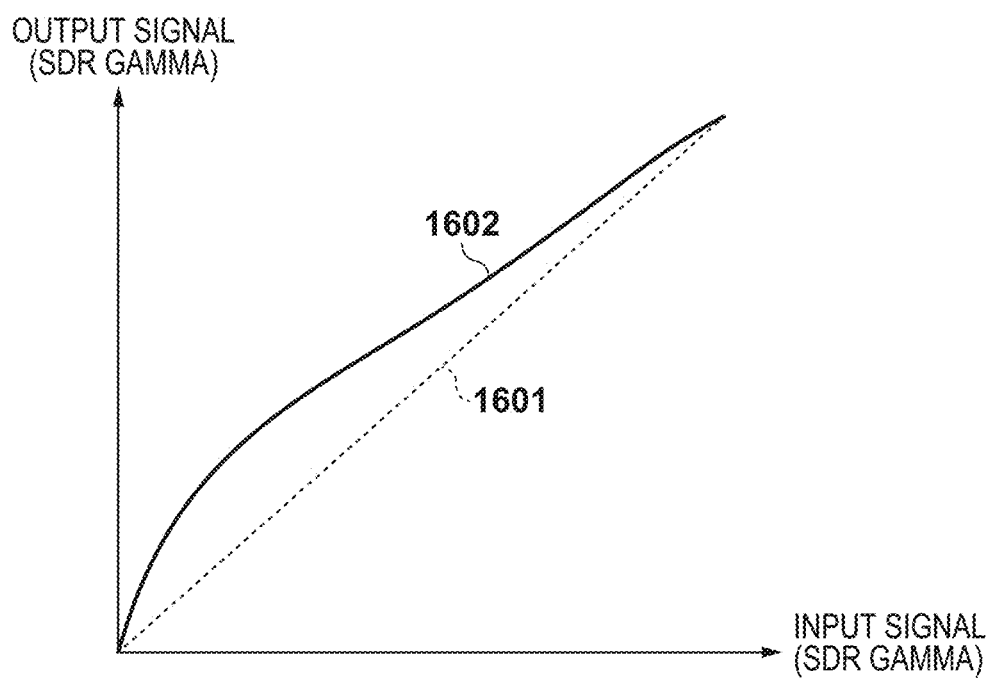
FIG. 16 is a diagram illustrating an example of local tone mapping processing.

A description is now given of an example of the local tone mapping processing of step S1402 with reference to FIG. 16. FIG. 16 shows exemplary tone characteristics that are used in local tone mapping. An input signal is a signal that was converted into the SDR gamma in step S1401, and an output signal is a target output signal that is to be achieved by the local tone mapping processing. The signal obtained by performing the gamma conversion corresponding to the SDR image with respect to the input HDR image becomes uniformly dark compared to the brightness represented by the HDR image because a signal with a wide dynamic range is confined in the SDR range as described earlier using FIG. 15. Therefore, as indicated by the tone characteristic 1602 of FIG. 16, the characteristic with which low luminance to intermediate luminance are corrected to be bright compared to the original tone characteristic 1601 is generated. Provided that the tone characteristic of FIG. 16 is y=tm (x), an image signal after the gamma conversion is p, and a low-frequency image generated by performing LPF processing and the like with respect to the image signal after the gamma conversion is p_lpf, an output signal p_out resulting from local tone mapping is represented by Equation (16).

$$p\_out = \frac{tm(p\_lpf)}{p\_lpf} \times p \quad (16)$$

In step S1403, the gamut conversion unit 1203 performs processing of conversion from the Rec. 2020 gamut of the HDR image input in step S1401 into the sRGB gamut of the SDR image. This processing may be processing based on simple matrix conversion, or may be gamut mapping processing that uses a lookup table.

Through the foregoing processing, the HDR image is converted into the SDR image.

As described above, according to the second embodiment, the image capturing apparatus 100 performs processing for correcting the influence of contrast with respect to the SDR image converted from the HDR image based on contrast influence information generated from the HDR image. In this way, the influence of contrast can be enlarged or further alleviated in a portion in which the influence of contrast appears weak compared to the HDR image due to the conversion from the HDR image into the SDR image.

OTHER EMBODIMENTS

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions, or units, of one or more of the above-described embodiment(s) and/or that includes one or more units or circuits (e.g., application specific integrated circuit (ASIC)) for performing the functions, or units, of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-209824, filed Nov. 20, 2019 which is hereby incorporated by reference herein in its entirety.

What is claimed is:

1. An image processing apparatus comprising at least one processor and/or circuit configured to function as following units:
   a first filter unit configured to generate a plurality of results of filter processing for brightness by individually applying each of a plurality of filters for brightness with different frequency bands to a first brightness component image indicating a distribution of brightness components in a first image, the plurality of filters for brightness being spatial filters based on a visual characteristic of a human related to contrast detection; and
   a first composition unit configured to generate brightness contrast influence information indicating a distribution of degrees of influence of brightness contrast in the first image by compositing together the plurality of results of filter processing for brightness, wherein the influence of brightness contrast indicates influence which causes a change in an appearance of brightness of a respective region depending on brightness of a peripheral region.

2. The image processing apparatus according to claim 1, wherein the at least one processor and/or circuit is further configured to function as following units:
   a first correction unit configured to correct the first brightness component image based on the brightness contrast influence information; and
   a first generation unit configured to generate a first corrected image in which an influence of brightness contrast has been corrected by compositing together the corrected first brightness component image and a first color component image indicating a distribution of color components in the first image.

3. The image processing apparatus according to claim 2, wherein
   the first correction unit corrects the first brightness component image so as to alleviate an influence of brightness contrast in the first corrected image that includes the corrected first brightness component image.

4. The image processing apparatus according to claim 2, wherein the at least one processor and/or circuit is further configured to function as a following unit:
   an obtainment unit configured to obtain the first brightness component image and the first color component image from the first image in an ICtCp color space or an Lab color space.

5. The image processing apparatus according to claim 1, wherein
   the plurality of filters for brightness are filters that utilize a Gaussian second-order differential function.

6. The image processing apparatus according to claim 1, wherein
   the first filter unit individually applies each of the plurality of filters for brightness after converting gamma of the first brightness component image to linear.

7. The image processing apparatus according to claim 1, wherein
   the first filter unit individually applies each of the plurality of filters for brightness after reducing the first brightness component image.

8. The image processing apparatus according to claim 1, wherein
   individually applying each of the plurality of filters for brightness to the first brightness component image includes applying a gain conforming to a frequency band of a corresponding filter for brightness.

9. The image processing apparatus according to claim 1, wherein
   the first composition unit generates the brightness contrast influence information indicating the distribution of degrees of influence of brightness contrast in the first image by allocating, as a value indicating a degree of influence of brightness contrast at each position in the first image, a largest value among corresponding positions in the plurality of results of filter processing for brightness.

10. The image processing apparatus according to claim 1, wherein
the first composition unit generates the brightness contrast influence information indicating the distribution of degrees of influence of brightness contrast in the first image by allocating, as a value indicating a degree of influence of brightness contrast at each position in the first image, an average value among corresponding positions in the plurality of results of filter processing for brightness.

11. The image processing apparatus according to claim 1, wherein the at least one processor and/or circuit is further configured to function as following units:
a second filter unit configured to generate a plurality of results of filter processing for color by individually applying each of a plurality of filters for color with different frequency bands to a first color component image indicating a distribution of color components in the first image, the plurality of filters for color being spatial filters based on a visual characteristic of a human related to contrast detection;
a second composition unit configured to generate color contrast influence information indicating a distribution of degrees of influence of color contrast in the first image by compositing together the plurality of results of filter processing for color;
a first correction unit configured to correct the first brightness component image based on the brightness contrast influence information;
a second correction unit configured to correct the first color component image based on the color contrast influence information; and
a first generation unit configured to generate a first corrected image in which an influence of brightness contrast and an influence of color contrast have been corrected by compositing together the corrected first brightness component image and the corrected first color component image.

12. The image processing apparatus according to claim 11, wherein
the first correction unit corrects the first brightness component image so as to alleviate an influence of brightness contrast in the first corrected image that includes the corrected first brightness component image, and
the second correction unit corrects the first color component image so as to alleviate an influence of color contrast in the first corrected image that includes the corrected first color component image.

13. The image processing apparatus according to claim 1, wherein the at least one processor and/or circuit is further configured to function as following units:
an image generation unit configured to generate, from the first image, a second image that has a smaller dynamic range for brightness components than the first image;
a third correction unit configured to correct a second brightness component image indicating a distribution of brightness components in the second image based on the brightness contrast influence information; and
a second generation unit configured to generate a second corrected image in which an influence of brightness contrast has been corrected by compositing together the corrected second brightness component image and a second color component image indicating a distribution of color components in the second image.

14. The image processing apparatus according to claim 13, wherein the third correction unit corrects the second brightness component image so as to enlarge an influence of brightness contrast in the second corrected image that includes the corrected second brightness component image.

15. The image processing apparatus according to claim 11, wherein the at least one processor and/or circuit is further configured to function as following units:
an image generation unit configured to generate, from the first image, a second image that has a smaller dynamic range for brightness components and color components than the first image;
a third correction unit configured to correct a second brightness component image indicating a distribution of brightness components in the second image based on the brightness contrast influence information;
a fourth correction unit configured to correct a second color component image indicating a distribution of color components in the second image based on the color contrast influence information; and
a second generation unit configured to generate a second corrected image in which an influence of brightness contrast and an influence of color contrast have been corrected by compositing together the corrected second brightness component image and the corrected second color component image.

16. The image processing apparatus according to claim 15, wherein
the third correction unit corrects the second brightness component image so as to enlarge an influence of brightness contrast in the second corrected image that includes the corrected second brightness component image, and
the fourth correction unit corrects the second color component image so as to enlarge an influence of color contrast in the second corrected image that includes the corrected second color component image.

17. An image capturing apparatus, comprising:
the image processing apparatus according to claim 1; and
an image sensor configured to generate the first image.

18. An image processing apparatus, comprising:
a filter unit configured to generate a plurality of results of filter processing for color by individually applying each of a plurality of filters for color with different frequency bands to a color component image indicating a distribution of color components in an image, the plurality of filters for color being spatial filters based on a visual characteristic of a human related to contrast detection; and
a composition unit configured to generate color contrast influence information indicating a distribution of degrees of influence of color contrast in the image by compositing together the plurality of results of filter processing for color, wherein the influence of color contrast indicates influence which causes a change in an appearance of a color of a respective region depending on a color of a peripheral region.

19. An image processing apparatus, comprising:
a filter unit configured to generate results of a plurality of filter processing for saturation by individually applying each of a plurality of filters for saturation with different frequency bands to a saturation component image indicating a distribution of saturation components in an image, the plurality of filters for saturation being spatial filters based on a visual characteristic of a human related to contrast detection; and a composition unit configured to generate saturation contrast influence information indicating a distribution of degrees of influence of saturation contrast in the image by compositing together the plurality of results of filter processing for saturation, wherein the influence of saturation contrast indicates influence which causes a change in an appearance of saturation of a respective region depending on saturation of a peripheral region.

20. An image processing method executed by an image processing apparatus, comprising:
generating a plurality of results of filter processing for brightness by individually applying each of a plurality of filters for brightness with different frequency bands to a first brightness component image indicating a distribution of brightness components in a first image, the plurality of filters for brightness being spatial filters based on a visual characteristic of a human related to contrast detection; and
generating brightness contrast influence information indicating a distribution of degrees of influence of brightness contrast in the first image by compositing together the plurality of results of filter processing for brightness, wherein the influence of brightness contrast indicates influence which causes a change in an appearance of brightness of a respective region depending on brightness of a peripheral region.

21. An image processing method executed by an image processing apparatus, comprising:
generating a plurality of results of filter processing for color by individually applying each of a plurality of filters for color with different frequency bands to a color component image indicating a distribution of color components in an image, the plurality of filters for color being spatial filters based on a visual characteristic of a human related to contrast detection; and
generating color contrast influence information indicating a distribution of degrees of influence of color contrast in the image by compositing together the plurality of results of filter processing for color, wherein the influence of color contrast indicates influence which causes a change in an appearance of a color of a respective region depending on a color of a peripheral region.

22. An image processing method executed by an image processing apparatus, comprising:
generating results of a plurality of filter processing for saturation by individually applying each of a plurality of filters for saturation with different frequency bands to a saturation component image indicating a distribution of saturation components in an image, the plurality of filters for saturation being spatial filters based on a visual characteristic of a human related to contrast detection; and
generating saturation contrast influence information indicating a distribution of degrees of influence of saturation contrast in the image by compositing together the plurality of results of filter processing for saturation, wherein the influence of saturation contrast indicates influence which causes a change in an appearance of saturation of a respective region depending on saturation of a peripheral region.

23. A non-transitory computer-readable storage medium which stores a program for causing a computer to execute an image processing method comprising:
generating a plurality of results of filter processing for brightness by individually applying each of a plurality of filters for brightness with different frequency bands to a first brightness component image indicating a distribution of brightness components in a first image, the plurality of filters for brightness being spatial filters based on a visual characteristic of a human related to contrast detection; and
generating brightness contrast influence information indicating a distribution of degrees of influence of brightness contrast in the first image by compositing together the plurality of results of filter processing for brightness, wherein the influence of brightness contrast indicates influence which causes a change in an appearance of brightness of a respective region depending on brightness of a peripheral region.

24. A non-transitory computer-readable storage medium which stores a program for causing a computer to execute an image processing method comprising:
generating a plurality of results of filter processing for color by individually applying each of a plurality of filters for color with different frequency bands to a color component image indicating a distribution of color components in an image, the plurality of filters for color being spatial filters based on a visual characteristic of a human related to contrast detection; and
generating color contrast influence information indicating a distribution of degrees of influence of color contrast in the image by compositing together the plurality of results of filter processing for color, wherein the influence of color contrast indicates influence which causes a change in an appearance of a color of a respective region depending on a color of a peripheral region.

25. A non-transitory computer-readable storage medium which stores a program for causing a computer to execute an image processing method comprising:
generating results of a plurality of filter processing for saturation by individually applying each of a plurality of filters for saturation with different frequency bands to a saturation component image indicating a distribution of saturation components in an image, the plurality of filters for saturation being spatial filters based on a visual characteristic of a human related to contrast detection; and
generating saturation contrast influence information indicating a distribution of degrees of influence of saturation contrast in the image by compositing together the plurality of results of filter processing for saturation, wherein the influence of saturation contrast indicates influence which causes a change in an appearance of saturation of a respective region depending on saturation of a peripheral region.

* * * * *